US011953695B2

(12) United States Patent
Hong et al.

(10) Patent No.: US 11,953,695 B2
(45) Date of Patent: Apr. 9, 2024

(54) WEARABLE ELECTRONIC DEVICE WITH DISPLAY

(71) Applicant: Samsung Electronics Co., Ltd., Suwon-si (KR)

(72) Inventors: Sungbin Hong, Suwon-si (KR); Yonghyun Park, Suwon-si (KR); Jongmin Yoon, Suwon-si (KR); Seungnyun Kim, Suwon-si (KR); Heonjun Ha, Suwon-si (KR); Junghee Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/826,297

(22) Filed: May 27, 2022

(65) Prior Publication Data

US 2022/0283439 A1    Sep. 8, 2022

Related U.S. Application Data

(63) Continuation of application No. PCT/KR2022/002971, filed on Mar. 3, 2022.

(30) Foreign Application Priority Data

Mar. 8, 2021  (KR) .......................... 10-2021-0030217

(51) Int. Cl.
G02B 27/01      (2006.01)
F21V 8/00       (2006.01)
(Continued)

(52) U.S. Cl.
CPC ....... *G02B 27/0179* (2013.01); *G02B 27/017* (2013.01); *G02F 1/29* (2013.01);
(Continued)

(58) Field of Classification Search
USPC .......................................................... 345/8
See application file for complete search history.

(56) References Cited

U.S. PATENT DOCUMENTS 10,281,745 B2    5/2019 Knoll
10,598,961 B2    3/2020 Shibuya et al.
(Continued)

FOREIGN PATENT DOCUMENTS

JP    2019002977 A    1/2019
KR    10-2016-0062971 A    6/2016
(Continued)

*Primary Examiner* — Chineyere D Wills-Burns

(57) ABSTRACT

It is provided the wearable electronic device including a skeletal member comprising a temple, a frame, and a bridge; a display fixed to the temple and configured to output visible light corresponding to a virtual image; a beam steering member comprising a liquid crystal and configured to adjust a direction of the visible light traveling from an exit pupil of the display to an input grating of an optical waveguide using the liquid crystal; the optical waveguide configured to adjust a path of the visible light and output the virtual image; an infrared output unit configured to output infrared light for tracking a gaze of a user; an infrared sensor configured to detect infrared light reflected from a pupil of the user; a bend sensor connected to the temple and the frame to measure a first bending state between the temple and the frame.

20 Claims, 13 Drawing Sheets

(51) Int. Cl.
  *G02B 27/00* (2006.01)
  *G02F 1/29* (2006.01)
(52) U.S. Cl.
  CPC ............... *G02B 2027/0178* (2013.01); *G02B 2027/0187* (2013.01); *G02F 2203/24* (2013.01)

(56) References Cited

U.S. PATENT DOCUMENTS

| | | | | |
|---|---|---|---|---|
| 10,775,633 | B1* | 9/2020 | Lee | G02B 27/0179 |
| 11,112,865 | B1* | 9/2021 | Fix | G06F 3/017 |
| 11,209,644 | B1* | 12/2021 | Fu | G02B 6/0016 |
| 11,592,681 | B2* | 2/2023 | Yaroshchuk | G02B 5/1833 |
| 2014/0211322 | A1* | 7/2014 | Bohn | G02B 27/0081 |
| | | | | 359/633 |
| 2016/0041390 | A1* | 2/2016 | Poon | G02B 5/3083 |
| | | | | 359/489.08 |
| 2017/0299860 | A1* | 10/2017 | Wall | G02B 3/04 |
| 2019/0250707 | A1* | 8/2019 | Kondo | G02B 27/0093 |
| 2019/0384063 | A1* | 12/2019 | Oliver | G02B 27/0172 |
| 2020/0174284 | A1 | 6/2020 | Chan et al. | |
| 2021/0266474 | A1* | 8/2021 | Sharma | G02B 27/0093 |
| 2021/0318558 | A1* | 10/2021 | Tzvieli | G02B 27/0093 |
| 2023/0244298 | A1* | 8/2023 | Ono | G06F 3/01 |
| | | | | 345/156 |
| 2023/0273677 | A1* | 8/2023 | Ono | G02C 11/00 |
| | | | | 345/157 |

FOREIGN PATENT DOCUMENTS

| | | |
|---|---|---|
| KR | 10-2017-0007485 A | 1/2017 |
| KR | 10-2019-0132491 A | 11/2019 |
| WO | 2019/018396 A1 | 1/2019 |

\* cited by examiner

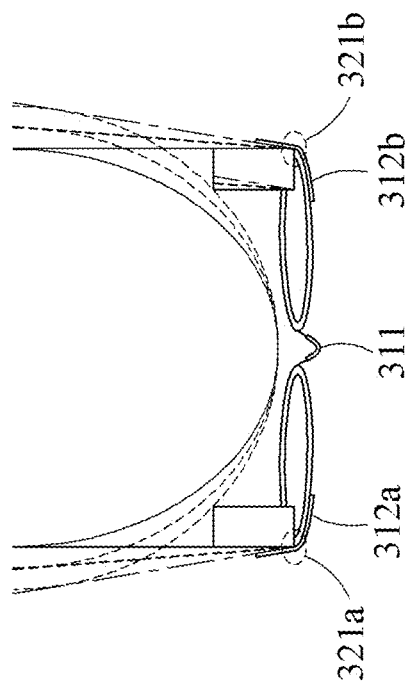
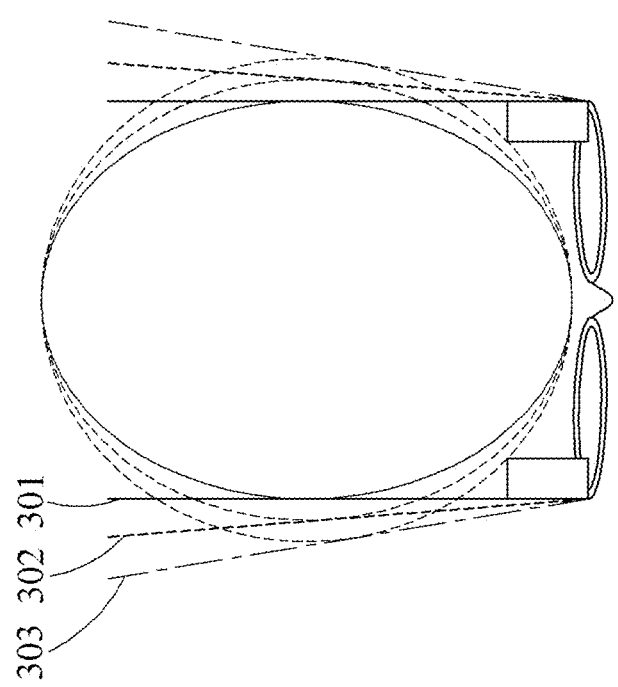
FIG.3B
FIG.3A

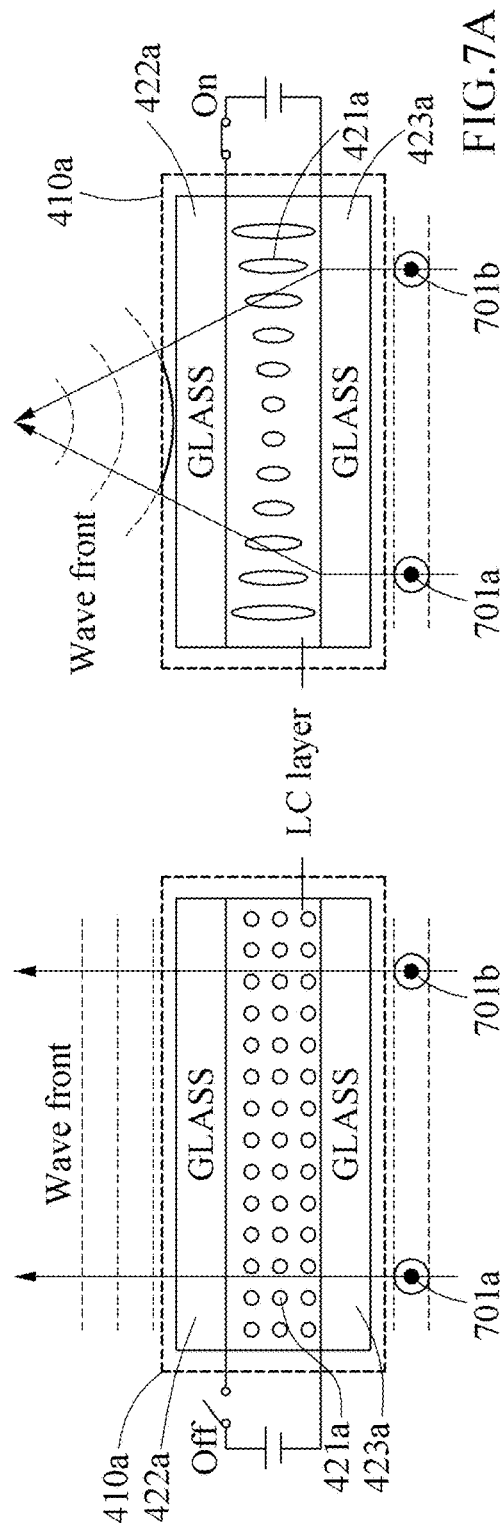
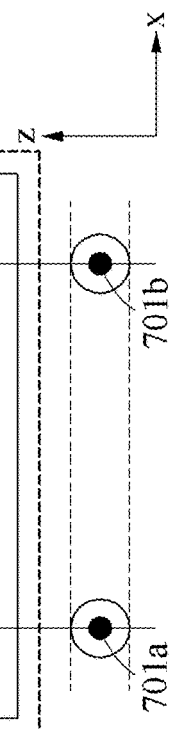
FIG. 7A
FIG. 7B

WEARABLE ELECTRONIC DEVICE WITH DISPLAY

CROSS-REFERENCE TO RELATED APPLICATIONS

This application is a continuation of International Application No. PCT/KR2022/002971 filed on Mar. 3, 2022, in the Korean Intellectual Property Receiving Office, which claims priority to Korean Patent Application No. 10-2021-0030217 filed on Mar. 8, 2021, in the Korean Intellectual Property Office, the disclosures of which are herein incorporated by reference in their entirety.

BACKGROUND

1. Field

Various example embodiments of the present disclosure relate to a wearable electronic device with a display.

2. Description of Related Art

Recently, with a sudden growth of electronic devices such as smartphones, tablet personal computers (PCs), etc., the electronic devices enabling wireless voice call and information exchange have become necessities of life. Electronic devices were initially recognized as simply portable devices for wireless calls. However, with the development of technology and the introduction of the wireless Internet, electronic devices are not simply portable devices for wireless calls but are developed into multimedia devices for performing functions such as scheduling, gaming, remote control, or image capturing, satisfying user demands.

In particular, in recent years, an electronic device providing an augmented reality (AR) service has been introduced on the market. An AR service is a service of superimposing a virtual image having supplementary information on a real-world image seen by a user and showing the superimposition result and may provide a user with a virtual image including content related to a real object identified from the real-world image.

SUMMARY

Human faces vary in size according to race, gender, and age and also vary in distance between the temples of the face. Augmented reality (AR) glasses manufactured assuming a standard face shape may be bent according to the size of the face of a wearer. When the distance between a temple and a frame changes, the distance between an exit pupil of an optical engine and an input grating of an optical waveguide may change. As a result, a distorted virtual image may be output.

However, the technical aspects are not limited to the aforementioned aspects, and other technical aspects may be present.

According to certain embodiments, a wearable electronic device includes: a skeletal member including a temple, a frame, and a bridge; a display fixed to the temple and configured to output visible light corresponding to a virtual image; a beam steering member including a liquid crystal and configured to adjust a direction of the visible light traveling from an exit pupil of the display to an input grating of an optical waveguide using the liquid crystal; the optical waveguide configured to adjust a path of the visible light and output the virtual image; an infrared output unit configured to output infrared light for tracking a gaze of a user; an infrared sensor configured to detect infrared light reflected from a pupil of the user; a bend sensor connected to the temple and the frame to measure a first bending state between the temple and the frame; a first control circuit configured to supply driving power and a control signal to the display; and a second control circuit configured to supply driving power and a control signal to the infrared sensor and the infrared output unit, measure a second bending state of the bridge based on a result of the detecting by the infrared sensor, and adjust the direction of the visible light through the beam steering member based on the first bending state and the second bending state.

According to certain embodiments, a wearable electronic device includes: a skeletal member including a temple, a frame, and a bridge; a self-luminous display fixed to the temple and including a plurality of visible-light pixels configured to output visible light corresponding to a virtual image and a plurality of infrared pixels configured to output infrared light; a beam steering member including a liquid crystal and configured to adjust a direction of the visible light traveling from an exit pupil of the self-luminous display to an input grating of an optical waveguide using the liquid crystal; an optical waveguide configured to adjust a path of the infrared light to output the infrared light to a pupil of a user and adjust a path of the visible light to output the virtual image; an infrared sensor configured to detect infrared light reflected from the pupil of the user; a bend sensor connected to the temple and the frame to measure a first bending state between the temple and the frame; a first control circuit configured to supply driving power and a control signal to the self-luminous display; and a second control circuit configured to measure a second bending state of the bridge based on a result of the detecting by the infrared sensor, and adjust the direction of the visible light through the beam steering member based on the first bending state and the second bending state.

According to example embodiments, a wearable electronic device may display a clear virtual image without a distortion to a user. According to example embodiments, a wearable electronic device may correct a distortion in a virtual image caused by a bending or torsion that may occur when a user wears the wearable electronic device. According to example embodiments, a wearable electronic device may provide a clear virtual image to a user by adjusting output visible light without needing to adjust its size according to the size or shape of the face of the user.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 3A and 3B illustrate bending states of a wearable electronic device when a user is wearing the wearable electronic device according to embodiments of this disclosure;

FIGS. 7A and 7B illustrate operating principles of a liquid crystal in a beam steering member of a wearable electronic device according to embodiments of this disclosure;

DETAILED DESCRIPTION

Figure 1:
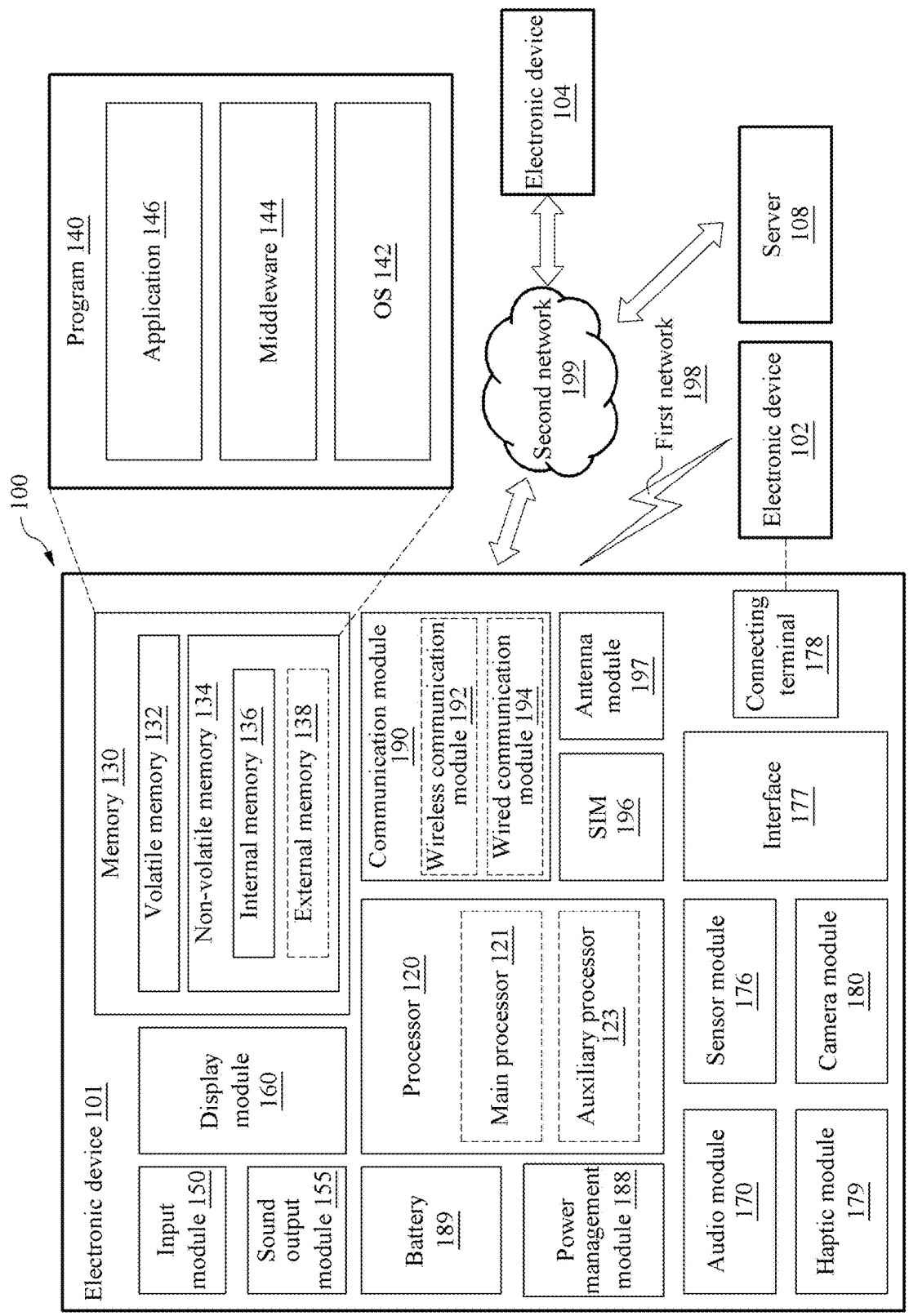
FIG. 1 illustrates a block diagram of an electronic device in a network environment according to embodiments of this disclosure.

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, example embodiments will be described in detail with reference to the accompanying drawings. When describing the example embodiments with reference to the accompanying drawings, like reference numerals refer to like constituent elements and a repeated description related thereto will be omitted.

FIG. 1 illustrates a block diagram of an electronic device in a network environment according to embodiments of this disclosure.

FIG. 1 is a block diagram illustrating an electronic device 101 in a network environment 100 according to various example embodiments. Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to certain embodiments, the electronic device 101 may communicate with the electronic device 104 via the server 108. According to certain embodiments, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In some example embodiments, at least one of the components (e.g., the connecting terminal 178) may be omitted from the electronic device 101, or one or more other components may be added in the electronic device 101. In some example embodiments, some of the components (e.g., the sensor module 176, the camera module 180, or the antenna module 197) may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to certain embodiments, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to certain embodiments, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to certain embodiments, the auxiliary processor 123 (e.g., an ISP or a CP) may be implemented as a portion of another component (e.g., the camera module 180 or the communication module 190) that is functionally related to the auxiliary processor 123. According to certain embodiments, the auxiliary processor 123 (e.g., an NPU) may include a hardware structure specified for artificial intelligence model processing. An artificial intelligence model may be generated by machine learning. Such learning may be performed by, for example, the electronic device 101 in which an artificial intelligence model is executed, or performed via a separate server (e.g., the server 108). Learning algorithms may include, but are not limited to, for example, supervised learning, unsupervised learning, semi-supervised learning, or reinforcement learning. The artificial intelligence model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The artificial intelligence model may additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 and an external memory 138.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to certain embodiments, the receiver may be implemented separately from the speaker or as a part of the speaker.

The display module 160 may visually provide information to the outside (e.g., a user) of the electronic device 101. The display module 160 may include, for example, a control circuit for controlling a display, a hologram device, or a projector and control circuitry to control a corresponding one of the display, the hologram device, and the projector. According to certain embodiments, the display module 160 may include a touch sensor adapted to detect a touch, or a pressure sensor adapted to measure the intensity of force incurred by the touch.

The audio module 170 may convert a sound into an electrical signal or vice versa. According to certain embodiments, the audio module 170 may obtain the sound via the input module 150 or output the sound via the sound output module 155 or an external electronic device (e.g., the electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electrical signal or data value corresponding to the detected state. According to certain embodiments, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to certain embodiments, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to certain embodiments, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or an electrical stimulus which may be recognized by a user via his or her tactile sensation or kinesthetic sensation. According to certain embodiments, the haptic module 179 may include, for example, a motor, a piezoelectric element, or an electric stimulator.

The camera module 180 may capture a still image and moving images. According to certain embodiments, the camera module 180 may include one or more lenses, image sensors, image signal processors, or flashes.

The power management module 188 may manage power supplied to the electronic device 101. According to certain embodiments, the power management module 188 may be implemented as, for example, at least a part of a power management integrated circuit (PMIC).

The battery 189 may supply power to at least one component of the electronic device 101. According to certain embodiments, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to certain embodiments, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to certain embodiments, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to certain embodiments, the antenna module 197 may include an antenna including a radiating element including a conductive material or a conductive pattern formed in or on a substrate (e.g., a printed circuit board (PCB)). According to certain embodiments, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to certain embodiments, another component (e.g., a radio frequency integrated circuit (RFIC)) other than the radiating element may be additionally formed as a part of the antenna module 197.

According to various example embodiments, the antenna module 197 may form a mmWave antenna module. According to certain embodiments, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to certain embodiments, commands or data may be transmitted or received between the electronic device 101 and the external electronic device 104 via the server 108 coupled with the second network 199. Each of the external electronic devices 102 or 104 may be a device of the same type as or a different type from the electronic device 101. According to certain embodiments, all or some of operations to be executed by the electronic device 101 may be executed at one or more of the external electronic devices 102 and 104, and the server 108. For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another example embodiment, the external electronic device 104 may include an Internet-of-things (IoT) device. The server 108 may be an intelligent server using machine learning and/or a neural network. According to certain embodiments, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
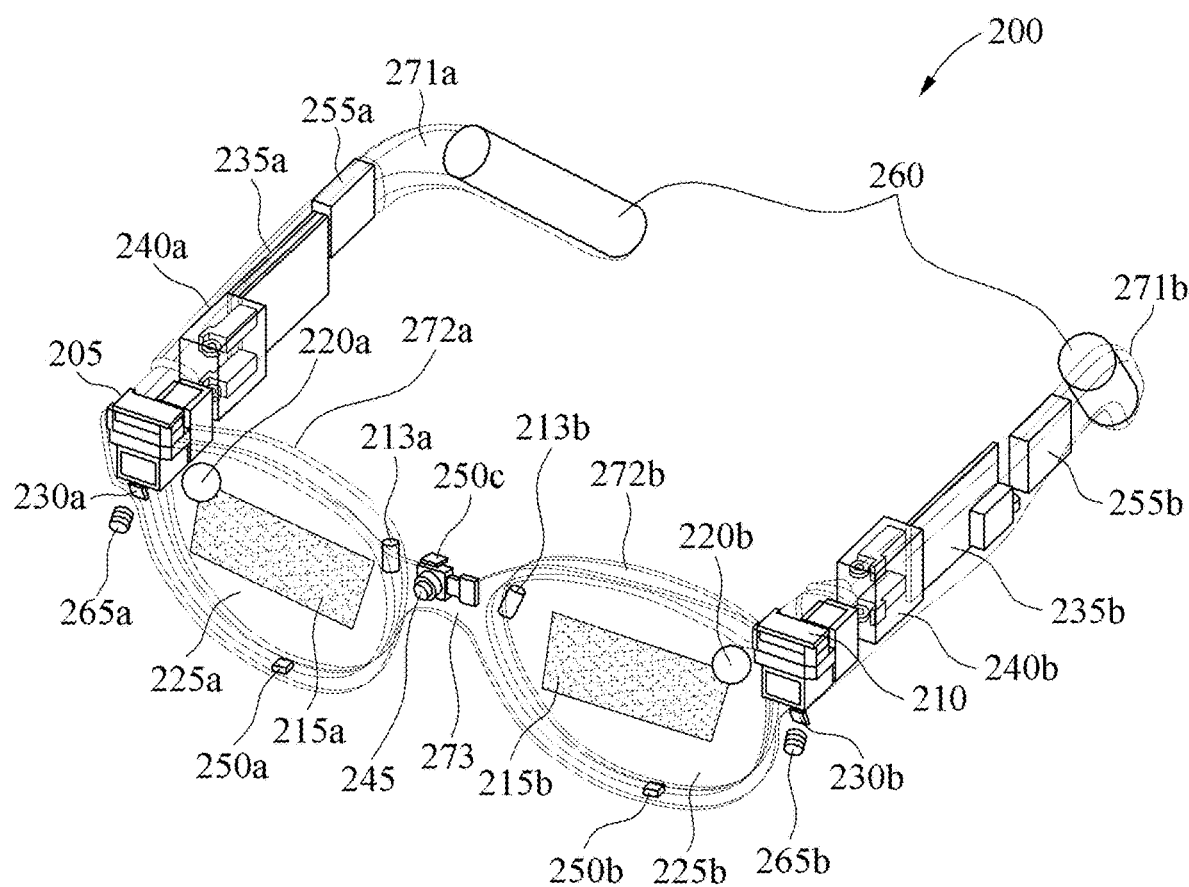
FIG. 2 illustrates a structure of a wearable electronic device according to embodiments of this disclosure.

FIG. 2 illustrates a structure of a wearable electronic device according to embodiments of this disclosure.

Referring to FIG. 2, a wearable electronic device 200 (e.g., the electronic device 101 of FIG. 1) may be worn on a face of a user to provide the user with an image related to an augmented reality (AR) service and/or a virtual reality (VR) service.

In certain embodiments, the wearable electronic device 200 may include a first display 205, a second display 210, optical waveguides 215a and 215b, input gratings 220a and 220b, a first transparent member 225a, a second transparent member 225b, lighting units 230a and 230b, a first PCB 235a, a second PCB 235b, a first hinge 240a, a second hinge 240b, a first camera 245, a plurality of microphones (e.g., a first microphone 250a, a second microphone 250b, and a third microphone 250c), a plurality of speakers (e.g., a first speaker 255a, and a second speaker 255b), a battery 260, a second camera 265a, and a third camera 265b.

In certain embodiments, a display (e.g., the display 205, 210 (e.g., the display module 160 of FIG. 1)) may include, for example, a liquid crystal display (LCD), a digital mirror device (DMD), or a liquid crystal on silicon (LCoS), an organic light-emitting diode (OLED), a micro light-emitting diode (micro LED), or the like. Although not shown, when the display is one of an LCD, a DMD, and an LCoS, the wearable electronic device 200 may include a light source configured to emit light to a screen output area of the display. In certain embodiments, when the display is capable of generating light by itself, for example, when the display is either an OLED or a micro LED, the wearable electronic device 200 may provide a virtual image with a relatively high quality to the user even though a separate light source is not included. In certain embodiments, when the display is implemented as an OLED or a micro LED, a light source may be unnecessary, and accordingly the wearable electronic device 200 may be reduced in weight. Hereinafter, a display capable of generating light by itself may be referred to as a "self-luminous display", and a description will be made on the assumption of the self-luminous display.

A display (e.g., the display 205, 210) according to various example embodiments may include at least one micro LED. For example, the micro LED may express red (R), green (G), and blue (B) by emitting light by itself, and a single chip may implement a single pixel (e.g., one of R, G, and B pixels) because the micro LED is relatively small in size (e.g., 100 μm or less). Accordingly, it may be possible to provide a high resolution without a backlight unit (BLU), when the display is implemented as a micro LED.

However, the example embodiments are not limited thereto, and a single chip may be implemented by a plurality of pixels including R, G, and B pixels.

In certain embodiments, the display (e.g., the display 205, 210) may include pixels for displaying a virtual image. The display may further include infrared pixels that emit infrared light.

In certain embodiments, the display may further include light-receiving pixels (e.g., photo sensor pixels) that are disposed between pixels and configured to receive light reflected from eyes of a user, convert the received light to electrical energy, and output the electrical energy. A light-receiving pixel may be referred to as a "gaze tracking sensor". The gaze tracking sensor may detect infrared light generated by reflecting light emitted by an infrared pixel included in the display by eyes of a user.

In certain embodiments, the wearable electronic device 200 may include separate gaze tracking cameras 213a and 213b (e.g., IR LED detection sensors). The gaze tracking cameras 213a and 213b may detect infrared light reflected by eyes of a user. The wearable electronic device 200 may track a gaze of a user based on the infrared light detected by the gaze tracking cameras 213a and 213b. The wearable electronic device 200 may determine a central position of a virtual image according to gaze directions (e.g., directions in which pupils of a right eye and a left eye of a user gaze) of a right eye and a left eye of the user.

In certain embodiments, the wearable electronic device 200 may detect a gaze direction (e.g., a movement of a pupil) of a user, using the light receiving pixels. For example, the wearable electronic device 200 may detect and track a gaze direction of a right eye of the user and a gaze direction of a left eye of the user through one or more light-receiving pixels of the first display 205 and one or more light-receiving pixels of the second display 210. The wearable electronic device 200 may determine a central position of a virtual image according to the gaze directions (e.g., directions in which pupils of the right eye and the left eye of the user gaze).

The first display 205 and the second display 210 may each include a first control circuit (not shown). The first control circuit may control the first display 205 or the second display 210. The first control circuit may control an operation of a liquid crystal element of a transparent cover (not shown) included in the first display 205 or the second display 210.

In certain embodiments, light emitted from the display (e.g., the display 205, 210) may reach the optical waveguide 215a formed on the first transparent member 225a that faces the right eye of the user, and the optical waveguide 215b formed on the second transparent member 225b that faces the left eye of the user, by passing through a lens (not shown) and a waveguide. For example, the light emitted from the display (e.g., the display 205, 210) may be reflected from a grating area of a waveguide formed in the optical waveguide 215a, 215b and the input grating 220a, 220b, and may be transmitted to the eyes of the user. The first transparent member 225a and/or the second transparent member 225b may be formed as, for example, a glass plate, a plastic plate, or a polymer, and may be transparently or translucently formed. The first transparent member 225a and the second transparent member 225b may each include a transparent substrate on which a transparent electrode formed of, for example, indium tin oxide (ITO), is disposed.

In certain embodiments, a lens may be disposed on a front surface of the display (e.g., the display 205, 210). The lens may include a concave lens and/or a convex lens. For example, the lens may include a projection lens or a collimation lens.

In certain embodiments, the optical waveguide 215a, 215b or a transparent member (e.g., the first transparent member 225a and the second transparent member 225b) may include a reflective lens, and a lens including a waveguide. The waveguide may be referred to as an "optical waveguide". The waveguide may be a path through which external light is incident, totally reflected, and emitted, and may be distinguished from the first transparent member 225a and the second transparent member 225b through which external light is simply reflected or transmitted.

In certain embodiments, the waveguide may be formed of glass, plastic, or a polymer, and may have a nanopattern formed on one surface of the inside or outside, for example, a grating structure of a polygonal or curved shape. According to certain embodiments, light incident to one end of the waveguide through the input grating 220a, 220b may be propagated inside a display waveguide by the nanopattern to be provided to the user. For example, a waveguide including a freeform prism may provide incident light to a user through a reflection mirror. The waveguide may include at least one of a reflective element (e.g., a reflection mirror) and at least one diffractive element (e.g., a diffractive optical element (DOE) or a holographic optical element (HOE)). In certain embodiments, the waveguide may guide light emitted from the display 205, 210 to an eye of the user, using the at least one diffractive element or the reflective element included in the waveguide.

According to various example embodiments, the diffractive element may include the input grating 220a, 220b and/or an output grating (not shown). For example, the input grating 220a, 220b may refer to an input grating area, and the output grating (not shown) may refer to an output grating area. The input grating area may function as an input terminal to diffract (or reflect) light output from the display (e.g., the display 205, 210 (e.g., a micro LED)) to transmit the light to the optical waveguide 215a, 215b. The output grating area may function as an exit to diffract (or reflect) light transmitted to the waveguide to an eye of the user.

The waveguide may function as a path through which light passes. The waveguide may include the input grating 220a, 220b and an output grating (not shown). An area of the waveguide in which light is totally reflected may be combined with or separate from the input grating 220a, 220b and the output grating (not shown).

According to various example embodiments, the reflective element may include a total reflection optical element or a total reflection waveguide for total internal reflection (TIR). For example, total reflection, which is one of schemes of inducing light, may form an angle of incidence such that light (e.g., a virtual image) entering through an input grating area is completely or almost completely reflected from one surface (e.g., a specific surface) of the waveguide, to completely or almost completely transmit the light to an output grating area.

In certain embodiments, the light emitted from the display 205, 210 may be guided by the waveguide through the input grating 220a, 220b, respectively. Light traveling in the waveguide may be guided toward the eyes of the user through the output grating. A screen output area may be determined based on light emitted toward the eyes of the user.

In certain embodiments, the first camera 245 may be referred to as a "high resolution (HR)" or a "photo video (PV)", and may include a high-resolution camera. The first camera 245 may include a color camera having functions for obtaining a high-quality image, such as an automatic focus (AF) function and an optical image stabilizer (OIS). The example embodiments are not limited thereto, and the first camera 245 may include a global shutter (GS) camera or a rolling shutter (RS) camera.

In certain embodiments, the second camera 265a and the third camera 265b may include cameras used for three degrees of freedom (3DoF) and six degrees of freedom (6DoF) head tracking, hand detection and tracking, and gesture and/or spatial recognition. For example, the second camera 265a and the third camera 265b may each include a GS camera to detect a movement of a head or a hand and track the movement.

In certain embodiments, head tracking, pose estimation and prediction, gesture and/or space recognition, and a function of simultaneous localization and mapping (SLAM) through depth imaging can be performed using at least one sensor (not shown, e.g., a gyro sensor, an acceleration sensor, a geomagnetic sensor, and/or a gesture sensor), the second camera 265a, and the third camera 265b may perform at least one of head tracking for 6DoF.

In certain embodiments, the second camera 265a and the third camera 265b may be classified and used as a camera for head tracking and a camera for hand tracking.

In certain embodiments, the lighting units 230a and 230b may be omitted. The lighting units 230a and 230b may be replaced by infrared pixels included in the first display 205 and the second display 210. In certain embodiments, the lighting units 230a and 230b may be included in the wearable electronic device 200 to assist infrared pixels included in the first display 205 and the second display 210. The lighting units 230a and 230b may be used differently according to positions in which the light units 230a and 230b are attached. For example, the lighting units 230a and 230b may be attached together with the second camera 265a and the third camera 265b mounted around a hinge (e.g., the first hinge 240a and the second hinge 240b) that connects frames 272a and 272b and temples 271a and 271b or around a bridge 273 that connects frames. If capturing is performed using a GS camera, the lighting units 230a and 230b may be used to supplement a surrounding brightness. For example, the lighting units 230a and 230b may be used in a dark environment or when it is not easy to detect a subject to be captured due to reflected light and mixing of various light sources.

In certain embodiments, a second control circuits (such as the processor 120 of FIG. 1) can be used for controlling components of the wearable electronic device 200 other than the first display 205 and the second display 210 may be located in PCBs (e.g., the first PCB 235a and the second PCB 235b). The second control circuits may control components other than the first display 205 and the second display 210 and perform an operation such as depth value estimation. The second control circuits may each include a communication circuit (e.g., the communication module 190 of FIG. 1) or a memory (e.g., the memory 130 of FIG. 1). In certain embodiments, the first control circuits and the second control circuits may be integrated as a single circuit. For example, the integrated control circuit may control the first display 205, the second display, and/or the other components.

In certain embodiments, a plurality of microphones (e.g., the first microphone 250a, the second microphone 250b, and the third microphone 250c (e.g., the input module 150 of FIG. 1)) may convert an external acoustic signal into electrical audio data. The processed audio data may be variously utilized according to a function (or an application being executed) being performed by the wearable electronic device 200.

In certain embodiments, a plurality of speakers (e.g., the first speaker 255a, the second speaker 255b, and the sound output module 155 of FIG. 1 (e.g., the sound output module 155)) may output audio data received from a communication circuit (e.g., the communication module 190 of FIG. 1) or stored in a memory (e.g., the memory 130 of FIG. 1).

In certain embodiments, one or more batteries 260 (e.g., the battery 189 of FIG. 1) may be included and may supply power to components of the wearable electronic device 200.

FIGS. 3A and 3B illustrate bending states of a wearable electronic device when a user is wearing the wearable electronic device according to embodiments of this disclosure.

Embodiments of the present disclosure take into consideration that a shape of a human faces varies from one human to the next. Thus, when a predetermined user wears a wearable electronic device (e.g., the wearable electronic device 200 of FIG. 2), there may occur a bending or a torsion between the components of a skeletal member (e.g., the frames 272a and 272b, the temples 271a and 271b, the hinge (e.g., the first hinge 240a and the second hinge 240b of FIG. 2), and/or the bridge 273). A wearable electronic device may not be an appropriate size of the face of the user, resulting in gaps between an exit pupil of a display and an input grating or cause a torsion or a bending vertically or laterally. This may cause a virtual image output from an output grating to be blurred as if it is out of focus. Accordingly, there is a demand for a technique for mitigating an effect of a bending or torsion of a wearable electronic device that may occur when a user wears the wearable electronic device, in a situation where it the wearable electronic device is not customized to the shape of an individual's face.

Referring to FIG. 3A, a normal state 301, a bending state 302, and a bending state 303 that can be observed when a user wears a wearable electronic device (e.g., the wearable electronic device 200 of FIG. 2) are shown. The normal state 301 may be a state of the temples 271a and 271b being in a preset positional relationship with the frames (e.g., the frames 272a and 272b of FIG. 2). The preset positional relationship may be a relationship between the temples 271a and 271b and the frames (e.g., the frames 272a and 272b of FIG. 2), set to be appropriate for an average shape of human faces. The bending states 302 and 303 may be states of the temples 271a and 271b and the frames (e.g., the frames 272a and 272b of FIG. 2) having a greater gap than in the normal state or being bent.

Referring to FIG. 3B, connecting parts between the components of the skeletal member of the wearable electronic device (e.g., the wearable electronic device 200 of FIG. 2) that may have an effect on the sharpness of a virtual image provided to a user are shown. Connecting parts 312a and 312b may indicate a connection relationship between the temples 271a and 271b and the frame (e.g., the frames 272a and 272b of FIG. 2). The connecting parts 312a and 321b may be implemented by hinges or may be implemented in a fixed form without the hinges. A connecting part 311 may indicate a connection relationship between the bridge (e.g., the bridge 273 of FIG. 2) and the frames (e.g., the frames 272a and 272b of FIG. 2).

Figures 4A, 4B, 4C:
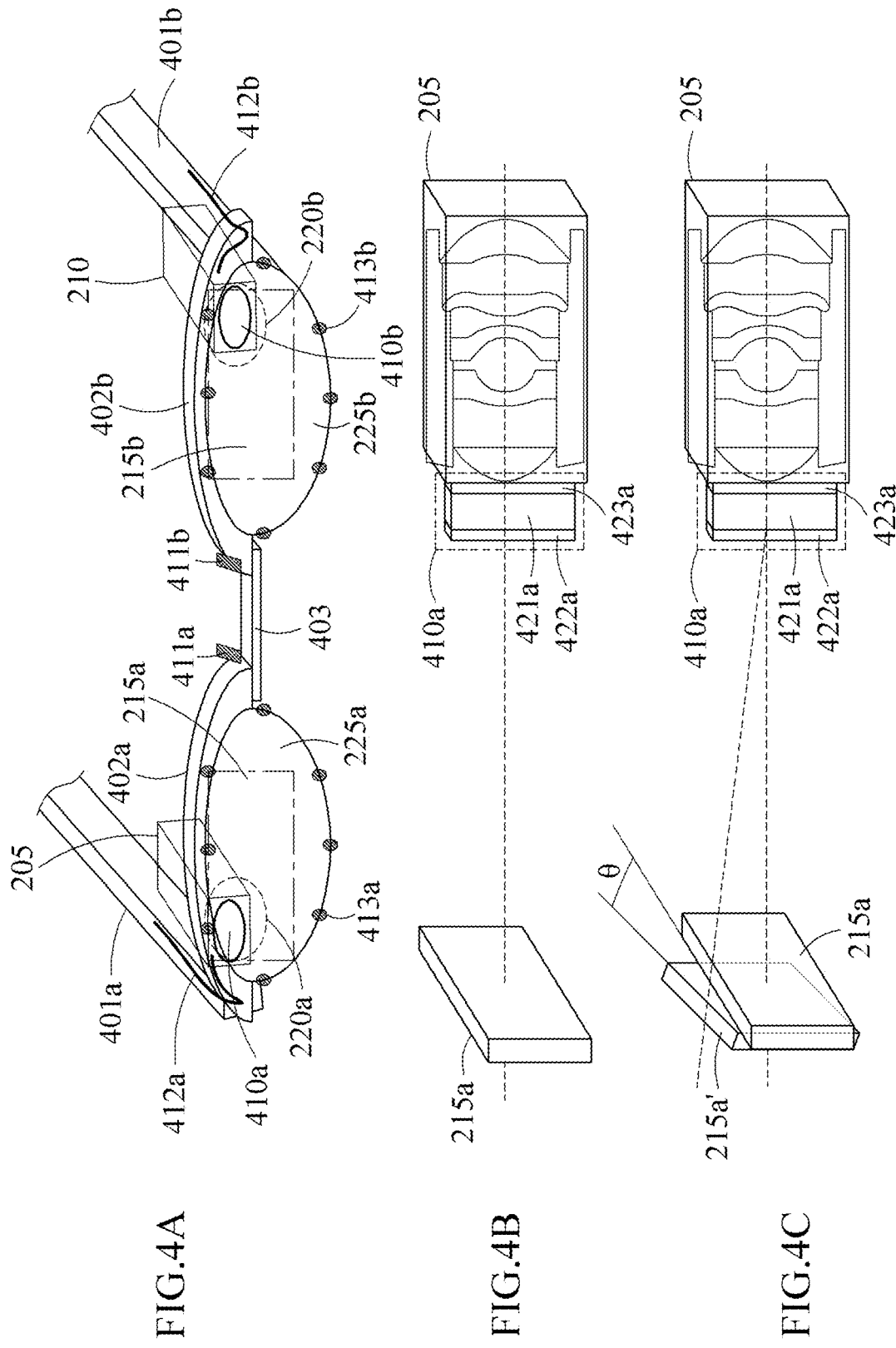
FIGS. 4A, 4B, and 4C illustrate configurations of a wearable electronic device according to embodiments of this disclosure.

FIGS. 4A to 4C illustrate configurations of a wearable electronic device according to embodiments of this disclosure.

Referring to FIG. 4A, a configuration of a wearable electronic device is illustrated according to certain embodiments is shown.

According to certain embodiments, a wearable electronic device 400 (e.g., the wearable electronic device 200 of FIG. 2) may include a skeletal member including temples 401a and 401b, frames 402a and 402b, and a bridge 403. The wearable electronic device 400 may include a display 205, 210 (e.g., the display 205, 210 of FIG. 2), a beam steering member 410a, 410b, an optical waveguide 215a, 215b (e.g., the optical waveguide 215a, 215b of FIG. 2), an infrared output unit 413a, 413b, an infrared sensor 411a, 411b, a bend sensor 412a, 412b, a first control circuit (not shown, e.g., the control circuit included in the display 205, 210 of FIG. 2), and a second control circuit (not shown, e.g., the control circuit positioned in the PCB 235a, 235b of FIG. 2). However, distinguishing between the first control circuit and the second control circuit is merely an example, and one control circuit may control the display and the other components, or three or more control circuits may control the components of the wearable electronic device 400. The frame may also be referred to as a rim. The temple may also be referred to as an arm.

The wearable electronic device 400 may transmit visible light corresponding to a virtual image from the display 205, 210 to an eye of a user through the optical waveguide 215a, 215b. The wearable electronic device 400 may track a gaze of the user and transmit the virtual image toward a pupil of the user. The wearable electronic device 400 may transmit the virtual image output from the display 205, 210 toward the eye of the user through the optical waveguide 215a, 215b, and at the same time provide a see-through function allowing the user to view the world outside of the wearable electronic device 400 through the transparent member 225a, 225b or the optical waveguide 215a, 215b. Here, the wearable electronic device 400 may include AR glasses.

According to certain embodiments, the wearable electronic device 400 may measure a distortion of the positional relationship between an exit pupil of the display 205, 210 and an input grating 220a, 220b of the optical waveguide 215a, 215b. For example, the wearable electronic device 400 may measure the distortion of the positional relationship between the exit pupil of the display 205, 210 and the input grating 220a, 220b of the optical waveguide 215a, 215b by measuring a bending or a torsion between the temple 401a, 401b and the frame 402a, 402b and measuring a bending or a torsion of the bridge 403.

According to certain embodiments, the wearable electronic device 400 may include the beam steering member 410a, 410b between the exit pupil of the display 205, 210 and the input grating 220a, 220b of the optical waveguide 215a, 215b. The wearable electronic device 400 may adjust the direction of the visible light, corresponding to the virtual image, traveling from the display 205, 210 to the optical waveguide 215a, 215b through the beam steering member 410a, 410b. According to certain embodiments, the beam steering member 410a, 410b may include a liquid crystal, and adjust the direction of the visible light from the exit pupil of the display 205, 210 toward the optical waveguide 215a, 215b by adjusting the refractive index of the liquid crystal.

The skeletal member (e.g., the frame 402a, 402b, the temple 401a, 401b, the hinge (e.g., the hinge 240a, 240b of FIG. 2), and/or the bridge 403) may support the other components of the wearable electronic device 400 and have a shape to be wearable on the face of the user. The temple 401a may be hinged with the frame 402a, the frame 402a and the frame 402b may be connected by the bridge 403, and the frame 402b may be hinged with the temple 401b.

The skeletal member of the wearable electronic device 400 may be manufactured to be appropriate for an average shape of human faces. In a normal state, the position of the exit pupil of the display 205, 210 of the wearable electronic device 400 may be aligned with the input grating 220a, 220b of the optical waveguide 215a, 215b. In the normal state, the visible light output from the display 205, 210 may be transmitted to an eyeball of the user through an output grating (not shown) of the optical waveguide 215a, 215b. Since the position of the exit pupil of the display 205, 210 and the input grating 220a, 220b of the optical waveguide 215a, 215b are precisely aligned in the normal state, a clear virtual image may be provided to the user.

In the normal state, the temple 401a and the frame 402a and the temple 401b and the frame 402b may be aligned so that a clear virtual image may be provided to the user. Here, the normal state may be a state of the temple 401a and the temple 401b being in a preset positional relationship with the frame 402a and the frame 402b, respectively. For example, the preset positional relationship may be a relationship between the temple 401a, 401b and the frame 402a, 402b, set to be appropriate for an average shape of human faces. Alternatively, the preset positional relationship may be a positional relationship between the temple 401a, 401b and the frame 402a, 402b by which light emitted from the display 205, 210 may be provided to the user without a distortion through the optical waveguide 215a, 215b. The optical waveguide 215a, 215b may be included in the transparent member 225a, 225b, and the transparent member 225a, 225b may be fixed to the frame 402a, 402b. A positional relationship between the temple 401a, 401b and the optical waveguide 215a, 215b may correspond to the positional relationship between the temple 401a, 401b and the frame 402a, 402b.

Referring to FIG. 4B, the optical waveguide 215a, the display 205, and the beam steering member 410a when the positional relationship between the temple 401a and the optical waveguide 215a is in a normal state are shown. In the normal state, the optical waveguide 215a and the display 205 are aligned such that a clear virtual image is provided to the user. The beam steering member 410a may be disposed between the display 205 and the optical waveguide. According to certain embodiments, the beam steering member 410a may be disposed on the exit pupil of the display 205, but is not limited thereto, and may be disposed on the optical waveguide 215a or may be disposed apart from the optical waveguide 215a and the display 205. The beam steering member 410a may include a liquid crystal 421a, and a first transparent member 423a and a second transparent member 422a for enclosing the liquid crystal 421a. The beam steering member 410a may be included in the display 205. The first transparent member 423a and the second transparent member 422a may each include a transparent substrate on which a transparent electrode formed of, for example, indium tin oxide (ITO), is disposed. Although FIG. 4B illustrates the configuration of the wearable electronic device 400 for the right eye for ease of description, the description may also similarly apply to the configuration of the wearable electronic device 400 for the left eye.

Referring back to FIG. 4A, the display 205, 210 may be fixed to the temple 401a, 401b. The display 205, 210 may output visible light corresponding to a virtual image. A first control circuit may supply driving power and a control signal to the display 205, 210.

The display 205, 210 for outputting the virtual image may include a non-luminous display or a self-luminous display. The non-luminous display may include a DMD or an LCoS, but is not limited thereto. The non-luminous display may include a projection display including a lighting light source, a lighting optical system, and a collimation lens. The self-luminous display may include an OLED or a micro LED, but is not limited thereto. The self-luminous display may not use a lighting light source and a lighting optical system.

The optical waveguide 215a, 215b may adjust a path of visible light and output a virtual image. The optical waveguide 215a, 215b may transmit visible light corresponding to the virtual image output from the display 205, 210 to an eye of the user. The optical waveguide 215a, 215b may include the input grating 220a, 220b to which visible light is incident, an area in which visible light is totally reflected, and an output grating for outputting visible light.

The optical waveguide 215a, 215b may be included in the transparent member 225a, 225b. The transparent member 225a, 225b may be formed of a glass plate, a plastic plate, or a polymer, and may be transparently or translucently formed. The transparent member 225a, 225b may be disposed to face an eye of the user. The transparent members 225a and 225b may be disposed to face the eyes of the user, respectively. The transparent member 225a, 225b may include the input grating 220a, 220b. Although FIG. 4A merely shows an example of the input grating 220a, 220b being included in the optical waveguide 215a, 215b, the input grating 220a, 220b may also be positioned separately from the optical waveguide 215a, 215b. The output grating may be included in the optical waveguide 215a, 215b or formed separately from the optical waveguide 215a, 215b. Alternatively, the output grating may constitute the entire optical waveguide 215a, 215b.

The infrared output unit 413a, 413b and the infrared sensor 411a, 411b may be used to detect and track a gaze of the user. Although reference numerals are omitted from FIG. 4A for readability, a plurality of infrared output units including the infrared output unit 413a, 413b may be disposed adjacent to the edge of the transparent member 225a, 225b. The infrared output unit 413a, 413b may output infrared light for tracking the gaze of the user. The infrared output unit 413a, 413b may output the infrared light toward a pupil of the user. The infrared sensor 411a, 411b may detect infrared light reflected from the pupil of the user after output by the infrared output unit 413a, 413b. For example, the infrared sensor 411a, 411b may include an infrared camera.

A second control circuit may supply driving power and a control signal to the infrared sensor 411a, 411b and the infrared output unit 413a, 413b.

According to certain embodiments, the bend sensor 412a, 412b may be connected to the temple 401a, 401b and the frame 402a, 402b to measure a first bending state between the temple 401a, 401b and the frame 402a, 402b. The bend sensor 412a, 412b refers to a sensor capable of detecting a structural deformation of a target. For example, the bend sensor 412a, 412b may include, without limitation, a sensor capable of detecting a structural deformation, such as a flex sensor, a Hall sensor, and an optical sensor. When the bend sensor 412a, 412b is a flex bend sensor (e.g., a flex sensor), the bend sensor 412a, 412b may include a variable resistor of which resistance changes according to a first bending state. The second control circuit may measure the first bending state based on an output voltage at one end of the variable resistor.

According to certain embodiments, the infrared output unit 413a may be disposed in plurality on the edge of the first transparent member 225a. The plurality of infrared output units including the infrared output unit 413a may output infrared light to the boundary of the pupil of the right eye of the user. The infrared output unit 413b may be disposed in plurality on the edge of the second transparent member 225b. The plurality of infrared output units including the infrared output unit 413b may output infrared light to the boundary of the pupil of the left eye of the user.

According to certain embodiments, the wearable electronic device 400 may detect infrared light reflected from the right eye through the infrared sensor 411a. The infrared light output from the plurality of infrared output units including the infrared output unit 413a may be radiated in a circle to the boundary of the pupil of the right eye, and the infrared sensor 411a may detect a plurality of rays of infrared light reflected from the right eye. The second control circuit may measure a center, a vertical angle, and a horizontal angle of the pupil of the right eye based on the detected plurality of rays of infrared light.

According to certain embodiments, the wearable electronic device 400 may detect infrared light reflected from the left eye through the infrared sensor 411b. The infrared light output from the plurality of infrared output units including the infrared output unit 413b may be radiated in a circle to the boundary of the pupil of the left eye, and the infrared sensor 411b may detect a plurality of rays of infrared light reflected from the left eye. The second control circuit may measure a center, a vertical angle, and a horizontal angle of the pupil of the left eye based on the detected plurality of rays of infrared light.

The result of detection by the infrared sensor 411a, 411b may include a left eye angle with respect to the pupil of the left eye of the user and a right eye angle with respect to the pupil of the right eye of the user. Here, the left eye angle refers to an angle viewed from the infrared sensor 411b in a triangle having the diameter of the pupil of the left eye of the user as the base and the infrared sensor 411b as the vertex. The right eye angle refers to an angle viewed from the infrared sensor 411a in a triangle having the diameter of the pupil of the right eye of the user as the base and the infrared sensor 411a as the vertex.

The boundary of a pupil may be estimated by the detected plurality of rays of infrared light. The second control circuit may measure the centers of the pupils of the left and right eyes, the left eye angle in a vertical or horizontal direction, the right eye angle in a vertical or horizontal direction based on the detected plurality of rays of infrared light.

According to certain embodiments, the second control circuit may measure a second bending state of the bridge 403 based on the result of detection by the infrared sensor 411a, 411b. For example, the second control circuit may measure the second bending state by comparing the left eye angle and the right eye angle. The second control circuit may measure the second bending state when a difference between the left eye angle and the right eye angle is greater than a threshold. Here, the threshold may be preset based on the sharpness of a virtual image that is provided to the user. When the difference between the left eye angle and the right eye angle is less than the threshold, the electronic device may determine that the difference between the left eye angle and the right eye angle has a small effect on the sharpness of the virtual image, and the second control circuit may reduce the processing capability and power consumption by skipping measurement of the second bending state.

Referring to FIG. 4C, the optical waveguide 215a, the display 205, and the beam steering member 410a when the positional relationship between the temple 401a and the optical waveguide 215a is in a bending state are shown. An optical waveguide 215a' in a bending state may have a difference from the optical waveguide 215a in the normal state by an angle of θ. According to certain embodiments, the second control circuit may adjust the direction of the visible light through the beam steering member 410a based on the first bending state and the second bending state. The beam steering member 410a may include a liquid crystal 421a, and a first transparent member 423a and a second transparent member 422a for enclosing the liquid crystal 421a. According to certain embodiments, the second control circuit may adjust the direction of the visible light by adjusting a voltage applied to the liquid crystal 421a included in the beam steering member 410a based on the first bending state and the second bending state.

According to certain embodiments, the beam steering member 410a may adjust the direction of the visible light projected from the display 205 to a predetermined direction. The beam steering member 410a may adjust the direction of the visible light traveling from the exit pupil of the display 205 to the input grating 220a of the optical waveguide 215a using the liquid crystal. According to certain embodiments, the beam steering member 410a may adjust the direction of the visible light by applying a voltage to an electrode connected to the liquid crystal to change the refractive index of the liquid crystal. For example, the wearable electronic device 400 may change the refractive index of the liquid crystal so that the visible light output from the display 205 may be bent in a direction reverse to the angle of bending. Although FIG. 4C illustrates the configuration of the wearable electronic device 400 for the right eye for ease of description, the description may also similarly apply to the configuration of the wearable electronic device 400 for the left eye.

According to certain embodiments, the wearable electronic device 400 may display a clear virtual image without a distortion to the user. The wearable electronic device 400 may correct a distortion in a virtual image caused by a bending or torsion that may occur when the user wears the wearable electronic device 400. The wearable electronic device 400 may provide a clear virtual image to the user by adjusting output visible light without needing to adjust its size according to the size or shape of the face of the user.

Figure 5A:
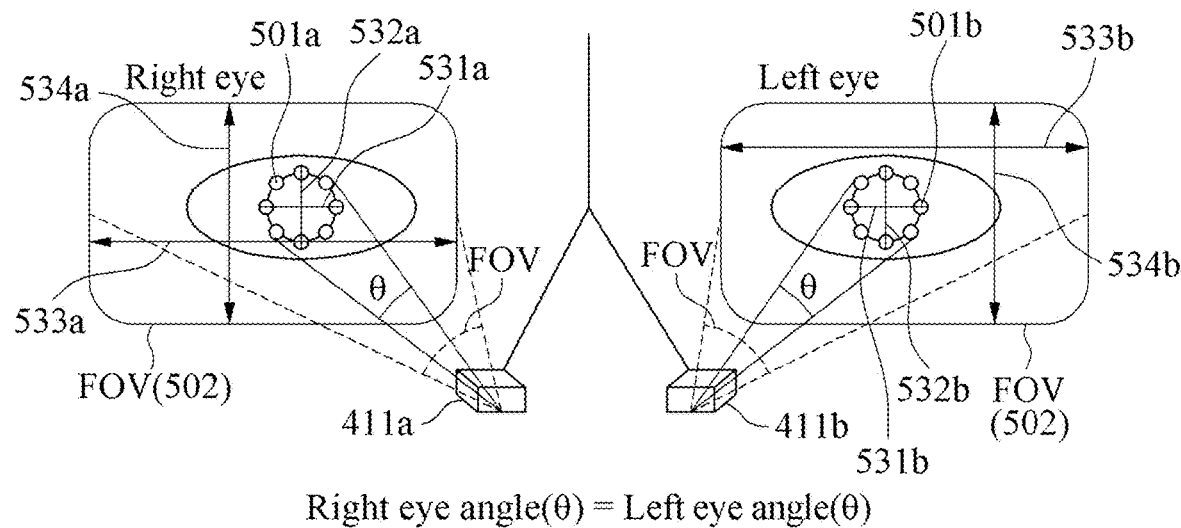
FIGS. 5A and 5B illustrate processes of measuring a second bending state by a wearable electronic device according to embodiments of this disclosure.
Figure 5B:
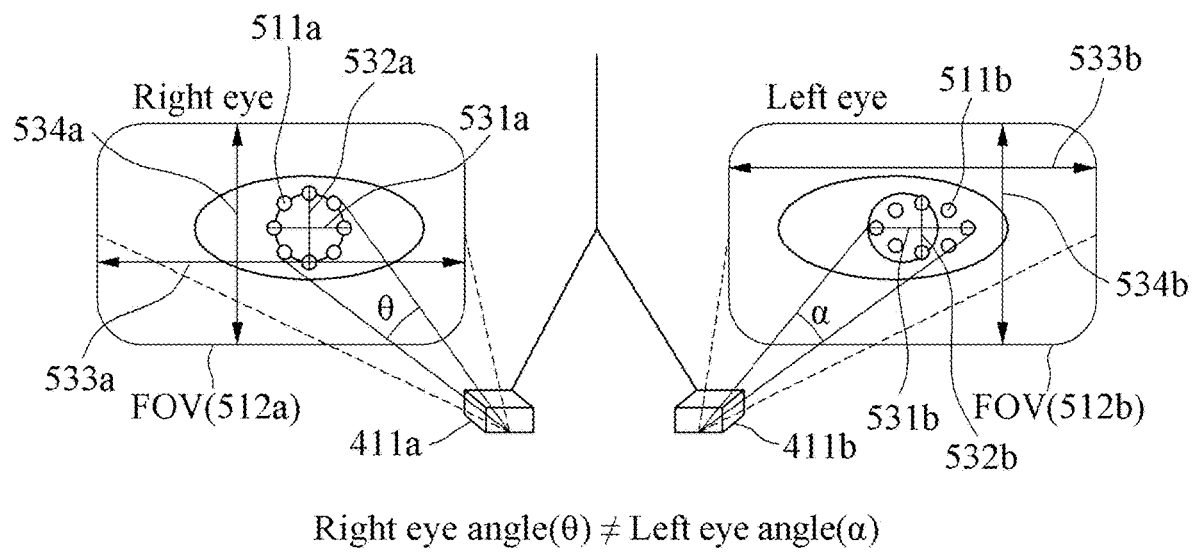

FIGS. 5A and 5B illustrate a process of measuring a second bending state by a wearable electronic device according to embodiments of this disclosure.

Referring to FIG. 5A, an angle of a pupil measured by the infrared sensor 411a, 411b when a positional relationship between a frame (e.g., the frame 272a, 272b of FIG. 2) and a bridge (e.g., the bridge 273 of FIG. 2) of a wearable electronic device (e.g., the wearable electronic device 400 of FIG. 4A) is in a normal state are shown.

An infrared output unit (e.g., the infrared output unit 413a of FIG. 4A) may be disposed in plurality on an edge of a transparent member for the right eye (e.g., the first transparent member 225a of FIG. 4A). The plurality of infrared output units may output infrared light to the boundary of the pupil of the right eye of the user. The infrared light output from the plurality of infrared output units may be radiated in a circle to the boundary of the pupil of the right eye.

The infrared sensor 411a for the right eye may have a field of view (FOV) 502a. A horizontal diameter 533a of the FOV of the infrared sensor 411a may be greater than a horizontal diameter 531a of the pupil of the right eye of the user. The wearable electronic device may detect a plurality of rays of infrared light 501a reflected from the right eye through the infrared sensor.

A second control circuit (e.g., the second control circuit of FIG. 2) may measure a right eye angle θ based on the detected plurality of rays of infrared light 501a. The second control circuit may measure an angle θ of a vertex of a triangle having the diameter 531a, 532a of the circle formed by the detected plurality of rays of infrared light 501a as the base. The angle may be measured in radians and expressed as a multiple of the size of pixels of the infrared sensor. For example, the radian angle may be expressed by N pixels of the infrared sensor, where N may be a natural number. The second control circuit may calculate a right eye angle θ based on the number of pixels corresponding to the horizontal diameter 533a of the FOV, the number of pixels corresponding to a vertical diameter 534a of the FOV, the number of pixels corresponding to the horizontal diameter 531a of the circle formed by the plurality of rays of infrared light 501a, and the number of pixels corresponding to a vertical diameter 532a of the circle formed by the plurality of rays of infrared light 501a. For example, an angle of view of the infrared sensor 411a may be expressed by a horizontal diameter and a vertical diameter, and may be predetermined as a design value. Pixels per degree (PPD) may be calculated by dividing the number of pixels corresponding to the inside of the angle of view by the angle of view. For example, when the number of pixels on a horizontal axis used in an infrared sensor having a horizontal angle of view of 60° is "1920", the PPD may be "32". As such, the second control circuit may calculate the size of the circle formed by the infrared reflected light 501a formed around the pupil by the number of pixels, and calculate the angle for the horizontal diameter 531a and the vertical diameter 532a by converting the number of pixels into an angle.

An infrared output unit (e.g., the infrared output unit 413a of FIG. 4A) may be disposed in plurality on an edge of a transparent member for the right eye (e.g., the second transparent member 225b of FIG. 4A). The plurality of infrared output units may output infrared light to the boundary of the pupil of the left eye of the user. The infrared light output from the plurality of infrared output units may be radiated in a circle to the boundary of the pupil of the left eye.

The infrared sensor 411b for the left eye may have a FOV. A horizontal diameter 533b of the FOV of the infrared sensor 411b may be greater than a horizontal diameter 531b of the pupil of the left eye of the user. The wearable electronic device may detect a plurality of rays of infrared light 501b reflected from the left eye through the infrared sensor 411b.

The second control circuit (e.g., the second control circuit of FIG. 2) may measure a left eye angle θ based on the detected plurality of rays of infrared light 501b. The second control circuit may measure an angle θ of a vertex of a triangle having the diameter 531b, 532b of the circle formed by the detected plurality of rays of infrared light 501b as the base. The angle may be measured in radians and expressed as a multiple of the size of pixels of the infrared sensor 411b. For example, the radian angles may be expressed by N pixels of the infrared sensor 411b, where N may be a natural number. The second control circuit may calculate a left eye angle θ based on the number of pixels corresponding to the horizontal diameter 533b of the FOV, the number of pixels corresponding to a vertical diameter 534b of the FOV, the number of pixels corresponding to the horizontal diameter 531b of the circle formed by the plurality of rays of infrared light 501b, and the number of pixels corresponding to a vertical diameter 532b of the circle formed by the plurality of rays of infrared light 501b.

The second control circuit may compare the left eye angle θ and the right eye angle θ. When the left eye angle θ and the right eye angle θ are the same, the second control circuit may determine that the wearable electronic device is in a normal state. Since a clear virtual image is output in the normal state, the second control circuit may maintain the direction of the visible light output from the display.

Referring to FIG. 5B, an angle of a pupil measured by the infrared sensor 411a, 411b when a positional relationship between a frame (e.g., the frame 272a, 272b of FIG. 2) and a bridge (e.g., the bridge 273 of FIG. 2) of a wearable electronic device (e.g., the wearable electronic device 400 of FIG. 4A) is in a distorted state are shown.

The second control circuit may measure a right eye angle θ based on a detected plurality of rays of infrared light 511a. The second control circuit may measure an angle θ of a vertex of a triangle having the diameter 531a, 532a of the circle formed by the detected plurality of rays of infrared light 511a as the base. The angle may be measured in radians and expressed as a multiple of the size of pixels of the infrared sensor. The second control circuit may calculate a right eye angle θ based on the number of pixels corresponding to the horizontal diameter 533a of the FOV of the infrared sensor 411a for the right eye, the number of pixels corresponding to the vertical diameter 534a of the FOV, the number of pixels corresponding to the horizontal diameter 531a of a circle formed by the plurality of rays of infrared light 511a, and the number of pixels corresponding to a vertical diameter 532a of the circle formed by the plurality of rays of infrared light 511a.

The second control circuit may measure a left eye angle α based on a detected plurality of rays of infrared light 511b. The second control circuit may measure an angle α of a vertex of a triangle having the diameter 531b, 532b of the circle formed by the detected plurality of rays of infrared light 511b as the base. The angle may be measured in radians and expressed as a multiple of the size of pixels of the infrared sensor. The second control circuit may calculate a left eye angle α based on the number of pixels corresponding to the horizontal diameter 533b of the FOV of the infrared sensor 411b for the left eye, the number of pixels corresponding to the vertical diameter 534b of the FOV, the number of pixels corresponding to the horizontal diameter 531b of a circle formed by the plurality of rays of infrared light 511b, and the number of pixels corresponding to a vertical diameter 532b of the circle formed by the plurality of rays of infrared light 511b.

The second control circuit may compare the left eye angle α and the right eye angle θ. When the left eye angle α and the right eye angle θ are different, the second control circuit may determine that the wearable electronic device is in a distorted state. However, the method for determination on the distorted state is not limited to the method of comparing the left eye angle and the right eye angle, and the determination on the distorted state may be performed through comparison with the angle measured in a normal state. For example, the second control circuit may also determine that the wearable electronic device is in a distorted state when the angle θ measured in FIG. 5A, which is a case without distortion, and the angle α measured in FIG. 5B are different. As another example, the second control circuit may determine whether the wearable electronic device is in a distorted state by comparing the horizontal or vertical diameter of the circle formed on the left eye by the plurality of rays of infrared light and the horizontal or vertical diameter of the circle formed on the right eye by the plurality of rays of infrared light. Since a distorted virtual image is output in the distorted state, the second control circuit may adjust the direction of the visible light output from the display.

Figure 6A:
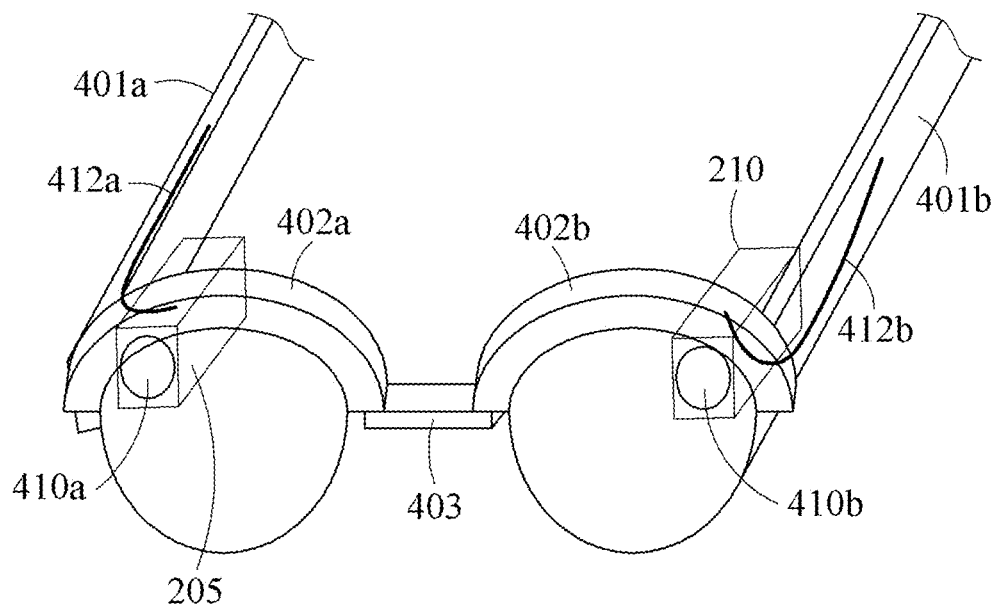
FIGS. 6A and 6B illustrate a process of measuring a first bending state by a wearable electronic device according to embodiments of this disclosure.
Figure 6B:
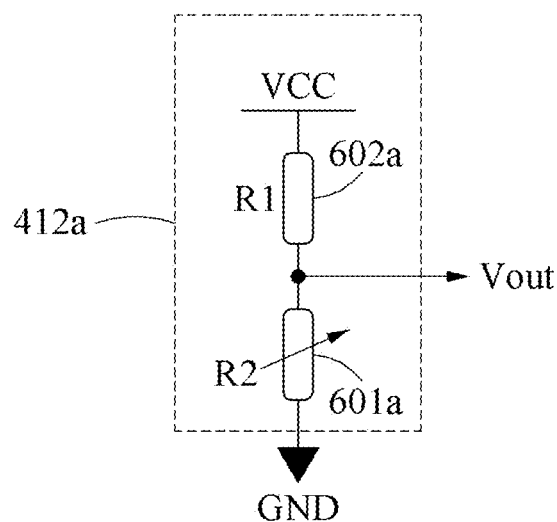

FIGS. 6A and 6B illustrate a process of measuring a first bending state by a wearable electronic device according to embodiments of this disclosure.

Referring to FIG. 6A, a position of a bend sensor in a wearable electronic device (e.g., the wearable electronic device 400 of FIG. 4A) is shown.

The bend sensor 412a, 412b may be connected to the temple 401a, 401b and the frame 402a, 402b to measure a first bending state between the temple 401a, 401b and the frame 402a, 402b. The display 205, 210 may be fixed to the temple 401a, 401b, and the transparent member 225a, 225b including the input grating 220a, 220b may be fixed to the frame 402a, 402b. Thus, the bend sensor 412a, 412b may measure a bending state between the temple 401a, 401b and the frame 402a, 402b, thereby measuring a change in the positional relationship between the display 205, 210 and the input grating 220a, 220b.

When the bend sensor 412a, 412b is a flex bend sensor (e.g., a flex sensor), the bend sensor 412a, 412b may include a variable resistor of which resistance changes according to a first bending state. The second control circuit may measure the first bending state based on an output voltage at one end of the variable resistor.

Referring to FIG. 6B, a configuration of a bend sensor of a wearable electronic device (e.g., the wearable electronic device 400 of FIG. 4A) is shown.

The bend sensor 412a may include a fixed resistor R1 602a and a variable resistor R2 601a. The resistance of the variable resistor 601a R2 may vary according to a degree of bending. When a voltage VCC applied to the bend sensor 412a is fixed, the resistance of the fixed resistor R1 602a is fixed. Thus, when the resistance of the variable resistor R2 601a changes, an output voltage Vout may change.

The wearable electronic device may convert Vout into a digital value using an analog-to-digital (A/D) converter. The wearable electronic device may store a table including information on angles of distortion corresponding to digital values in advance in a memory. The wearable electronic device may output an angle of distortion corresponding to an output digital value.

FIGS. 7A and 7B illustrate operating principles of a liquid crystal in a beam steering member of a wearable electronic device according to embodiments of this disclosure.

Referring to FIG. 7A, states of a liquid crystal in a beam steering member when a voltage is not applied and when a voltage is applied are shown, respectively.

A left diagram of FIG. 7A shows the example when a voltage is not applied. The beam steering member 410a (e.g., the beam steering member 410a of FIG. 4A) may include the liquid crystal 421a, and the first transparent member 423a and the second transparent member 422a for enclosing the liquid crystal 421a. The first transparent member 423a and the second transparent member 422a may each be, for example, glass, but are not limited thereto, and may include any transparent materials. Since a voltage is not applied to the liquid crystal 421a, the liquid crystal 421a may output intact visible light incident from a light source 701a, 701b without refraction.

A right diagram of FIG. 7A shows the example when a voltage is applied. When a voltage is applied through an electrode, a refractive index of the liquid crystal 421a may be changed. For example, the liquid crystal 421a has optical properties that change according to a change in voltage and thus, may electrically adjust transmission of visible light. As the refractive index of the liquid crystal 421a is changed, the direction of visible light incident from the light source 701a, 701b to the liquid crystal 421a may be adjusted.

Referring to FIG. 7B, a configuration of a beam steering member is shown.

The beam steering member 410a may include the liquid crystal 421a, and the first transparent member 423a and the second transparent member 422a for enclosing the liquid crystal 421a. The first transparent member 423a may include a common electrode 705, and the second transparent member 422a may include one or more electrodes. For example, the second transparent member 422a may include a first electrode 701, a second electrode 702, and a third electrode 703.

A second control circuit may sum a first bending state and a second bending state, and apply a voltage of the first electrode 701 to the first electrode 701, a voltage of the second electrode 702 to the second electrode 702, and a voltage of the third electrode 703 to the third electrode 703, corresponding to a result of the summing. As the voltages are applied, the shape of the liquid crystal 704 may be changed, and the refractive index of the liquid crystal 421a may be changed. As the refractive index of the liquid crystal 421a is changed, the direction of visible light incident from the light source 701a, 701b to the liquid crystal 421a may be adjusted.

For example, the result of summing the first bending state and the second bending state may be as in Table 1. For example, the voltage of the first electrode 701, the voltage of the second electrode 702, and the voltage of the third electrode 703 corresponding to the result of the summing may be as in Table 2.

TABLE 1

| First bending state | | Second bending state | | Summation result | |
| --- | --- | --- | --- | --- | --- |
| Left | Right | Left | Right | Left | Right |
| 2° | 3° | 1° | 2° | 3° | 5° |
| 4° | 6° | 2° | 3° | 6° | 9° |
| 5° | 8° | 3° | 4° | 8° | 12° |
| 10° | 12° | 4° | 5° | 14° | 17° |

TABLE 2

| Summation result | First electrode voltage | Second electrode voltage | Third electrode voltage |
| --- | --- | --- | --- |
| 5° | 1.0 V | 1.2 V | 1.4 V |
| 6-10° | 1.5 V | 1.8 V | 2.1 V |
| 11-15° | 2.0 V | 2.4 V | 2.8 V |
| 16-20° | 2.6 V | 3.1 V | 3.6 V |

Figure 8A:
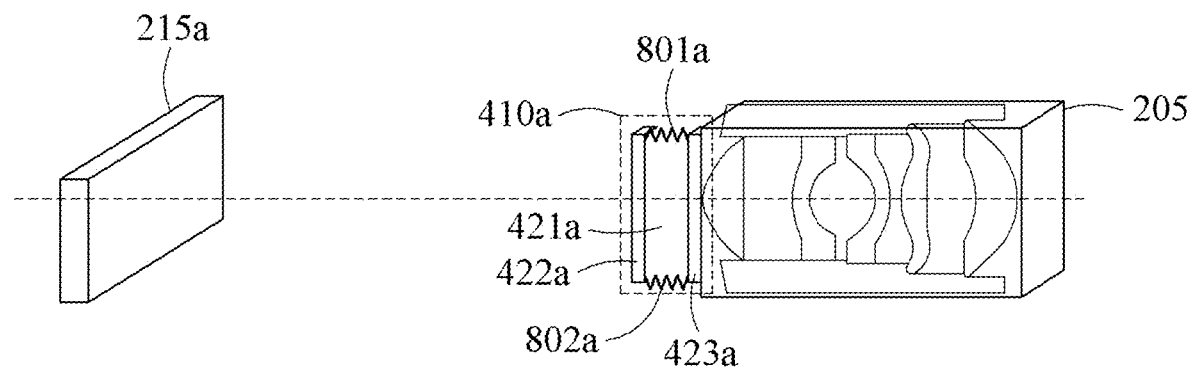
FIGS. 8A and 8B illustrate operating principles of torsion adjusters in a beam steering member of a wearable electronic device according to embodiments of this disclosure.
Figure 8B:
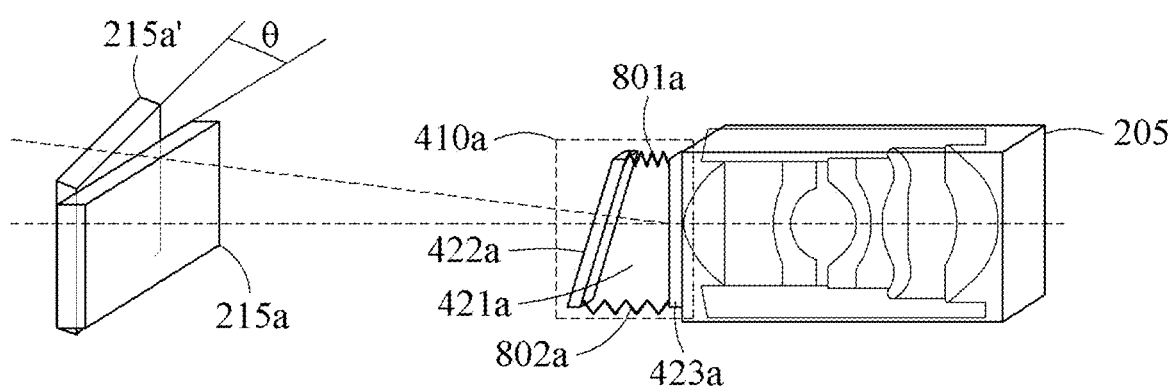

FIGS. 8A and 8B illustrate operating principles of torsion adjusters in a beam steering member of a wearable electronic device according to embodiments of this disclosure.

Referring to FIG. 8A, a relationship among the optical waveguide 215a (e.g., the optical waveguide 215a of FIG. 4A), the display 205 (e.g., the display 205 of FIG. 4A), and the beam steering member 410a (e.g., the beam steering member 410a of FIG. 4A) when a positional relationship between a temple (not shown, e.g., the temple 401a of FIG. 4A) and the optical waveguide 215a is in a normal state is shown.

The beam steering member 410a may further include torsion adjusters 801a and 802a, in addition to the first transparent member 423a and the second transparent member 422a for enclosing the liquid crystal 421a. The torsion adjusters 801a and 802a may adjust a positional relationship between the first transparent member 423a and the second transparent member 422a. For example, the torsion adjusters 801a and 802a may include bellows. For example, a high-refractive index liquid may be included in the bellows, and the thickness of the high-refractive index liquid may be changed like a prism according to a degree of expansion or contraction of the bellows, whereby the direction of light may be adjusted.

The bend sensor 412a, 412b may measure a first torsion state between a temple and a frame. A second control circuit may measure a second torsion state of a bridge based on a result of detection by an infrared sensor. The second control circuit may determine whether a wearable electronic device is twisted based on the first torsion state and the second torsion state. When the positional relationship is determined to be in a normal state, a clear virtual image may be output to a user.

Referring to FIG. 8B, a relationship among the optical waveguide 215a, the display 205, and the beam steering member 410a when a positional relationship between a temple (not shown, e.g., the temple 401a of FIG. 4A) and the optical waveguide 215a is in a torsion state is shown.

A second control circuit may adjust a positional relationship between the first transparent member 423a and the second transparent member 422a through the torsion adjusters 801a and 802a based on a first torsion state and a second torsion state. The second control circuit may apply voltages to the torsion adjusters 801a and 802a according to a voltage table determined for torsion correction corresponding to the first torsion state and the second torsion state. When the voltages are applied, the torsion adjusters 801a and 802a may be controlled, and a torsion of a virtual image may be mitigated.

A bellow may include a sensor and one or more actuators. The actuators may operate in response to an output of the sensor of the bellow. A corresponding relationship between outputs of the sensor included in the bellow corresponding to the first torsion state and the second torsion state may be preset and stored in a memory. The second control circuit may retrieve an output of a corresponding sensor in response to an input of the first torsion state or the second torsion state. The second control circuit may drive the actuators of the bellow according to the output of the corresponding sensor.

Figure 9:
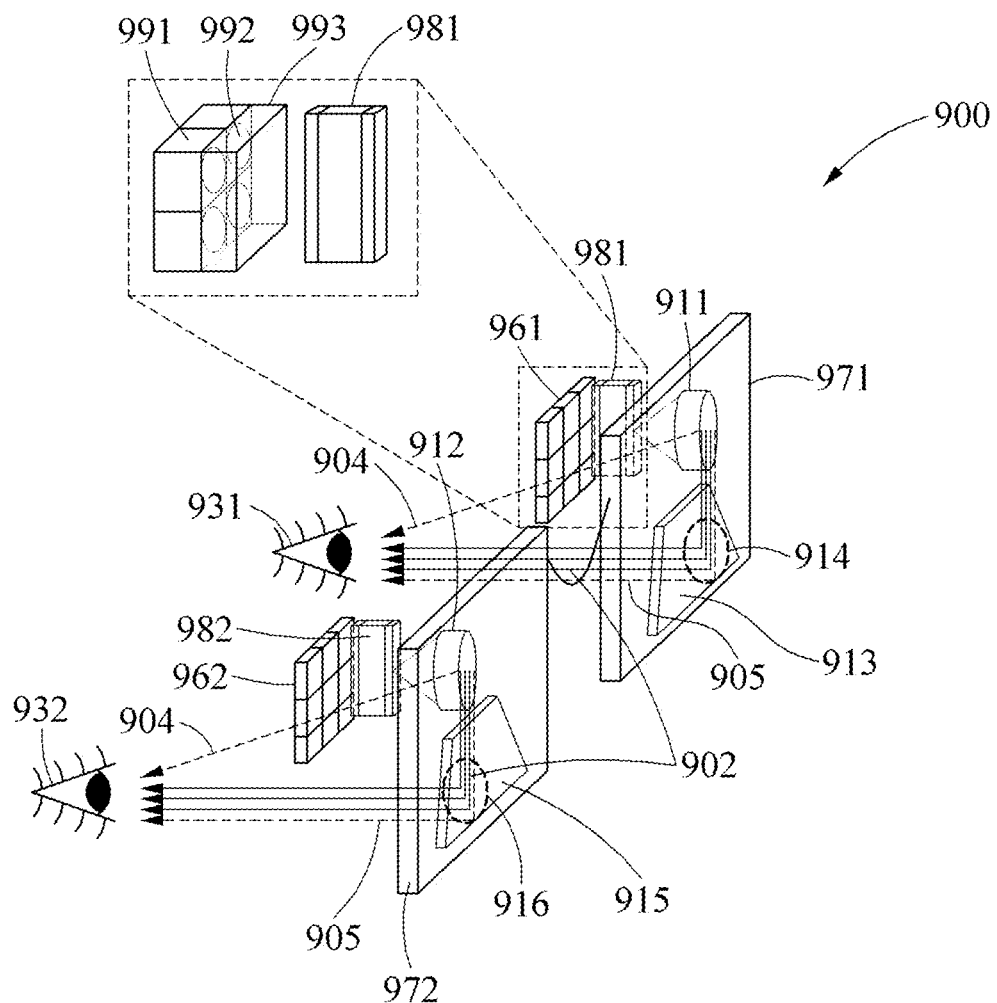
FIG. 9 illustrates a structure of a wearable electronic device according to embodiments of this disclosure.

FIG. 9 illustrates a structure of a wearable electronic device according to embodiments of this disclosure.

According to certain embodiments, a wearable electronic device 900 may include a skeletal member including a temple (e.g., the temple 401a, 401b of FIG. 4A), a frame (e.g., the frame 402a, 402b of FIG. 4A), and a bridge (e.g., the bridge 403 of FIG. 4A). The wearable electronic device 900 may include a self-luminous display 961, 962, a beam steering member 981, 982 (e.g., the beam steering member 410a, 410b of FIG. 4A), an optical waveguide 913, 915 (e.g., the optical waveguide 215a, 215b of FIG. 4A), an infrared sensor (which may be included in the self-luminous display 961, 962 or implemented as the infrared sensor 411a, 411b of FIG. 4A), a bend sensor (e.g., the bend sensor 412a, 412b (e.g., a flex sensor)), a first control circuit (e.g., the control circuit included in the display 205, 210 of FIG. 2), and a second control circuit (e.g., the control circuit included in the PCB 235a, 235b of FIG. 2). However, distinguishing between the first control circuit and the second control circuit is merely an example, and one control circuit may control the self-luminous display 961, 962 and the other components, or three or more control circuits may control the components of the wearable electronic device 900.

The self-luminous display 961, 962 may be fixed to the temple. The self-luminous display 961, 962 may include a plurality of visible-light pixels for outputting visible light 902 corresponding to a virtual image, and a plurality of infrared pixels for outputting infrared light 905. The visible-light pixels may include R, G, and B pixels. The self-luminous display 961, 962 may include, for example, an OLED or a micro LEDs, but is not limited thereto. The self-luminous display 961, 962 may not use a lighting light source and a lighting optical system.

The beam steering member 981, 982 may be disposed between a micro LED 991 of the self-luminous display 961, 962 and an input grating 911, 912 (e.g., the input grating 220a, 220b of FIG. 4A). A transparent cover 993 may be disposed between the micro LED 991 and the beam steering member 981, 982. A microlens 992 may be disposed between the transparent cover 993 and the micro LED 991. The microlens 992 may increase an efficiency and an intensity of light output from the micro LED 991. Partitions (not shown) may be installed between the R, G, and B pixels. The partitions may prevent mixing and reflection of light emitted from each of the R, G, and B pixels and light of a neighboring pixel, to increase an efficiency and an intensity of light passing through the microlens 992.

The optical waveguide 913, 915 may adjust a path of infrared light and output the infrared light to a pupil of the user, and adjust a path of the visible light 902 and output the virtual image. The optical waveguide 913, 915 may transmit the visible light 902 corresponding to the virtual image, output from the self-luminous display 961, 962, to an eye of the user. The optical waveguide 913, 915 may include the input grating 911, 912 to which the visible light 902 is incident, an area in which the visible light 902 is totally reflected, and an output grating 914, 916 for outputting the visible light 902.

The optical waveguide 913, 915 may be included in a transparent member 971, 972 (e.g., the transparent member 225a, 225b of FIG. 4A). The transparent member 971, 972 may be formed of a glass plate, a plastic plate, or a polymer, and may be transparently or translucently formed. The transparent member 971, 972 may be disposed to face an eye of the user. The transparent members 971 and 972 may be disposed to face both eyes of the user, respectively. The transparent member 971, 972 may include the input grating 911, 912. Although FIG. 9 merely shows an example of the input grating 911, 912 being separate from the optical waveguide 913, 915, the input grating 911, 912 may also be included in the optical waveguide 913, 915. In addition, although FIG. 9 merely shows an example of the output grating 914, 916 being included in the optical waveguide 913, 915, the output grating 914, 916 may also be separate from the optical waveguide 913, 915. In addition, the output grating 914, 916 may also constitute the entire optical waveguide 913, 915.

Infrared light output from the self-luminous display 961, 962 may be incident to the input grating 911, 912 and then reflected by the optical waveguide 913, 915. Reflected infrared light 904 may be output directly toward an eye 931, 932 of the user. Reflected infrared light 905 may pass through the optical waveguide 913, 915 and be output toward the eye 931, 932 of the user through the output grating 914, 916.

An infrared sensor may detect infrared light (not shown) reflected from a pupil of the user. According to certain embodiments, the infrared sensor may be disposed in the wearable electronic device 900 separately from the self-luminous display 961, 962. According to another example embodiment, the infrared sensor may be implemented by infrared sensing pixels included in the self-luminous display 961, 962, together with the plurality of visible-light pixels and the plurality of infrared pixels. Here, the infrared sensing pixels may sense infrared light reflected from human eyes, instead of a separate infrared sensing camera.

The wearable electronic device 900 may include the beam steering member 981, 982 between an exit pupil of the self-luminous display 961, 962 and the input grating 911, 912 of the optical waveguide 913, 915. The wearable electronic device 900 may adjust the direction of the visible light 902, corresponding to the virtual image, traveling from the self-luminous display 961, 962 to the optical waveguide 913, 915 through the beam steering member 981, 982. The beam steering member 981, 982 may include a liquid crystal, and adjust the direction of the visible light 902 from the exit pupil of the self-luminous display 961, 962 toward the optical waveguide 913, 915 by adjusting the refractive index of the liquid crystal.

A bend sensor may be connected to a temple and a frame to measure a first bending state between the temple and the frame. The bend sensor may include a variable resistor of which resistance changes according to the first bending state. The second control circuit may measure the first bending state based on an output voltage at one end of the variable resistor.

A first control circuit may supply driving power and a control signal to the self-luminous display 961, 962. When an infrared sensor is provided separately from the self-luminous display 961, 962, a second control circuit may supply driving power and a control signal to the infrared sensor.

The second control circuit may measure a second bending state of a bridge based on a result of detection by the infrared sensor. The result of detection by the infrared sensor may include a left eye angle with respect to the pupil of the left eye of the user and a right eye angle with respect to the pupil of the right eye of the user. The second control circuit may measure the second bending state by comparing the left eye angle and the right eye angle. The second control circuit may measure the second bending state when a difference between the left eye angle and the right eye angle is greater than a threshold. When the difference between the left eye angle and the right eye angle is less than the threshold, the electronic device may determine that the difference between the left eye angle and the right eye angle has a small effect on the sharpness of the virtual image, and the second control circuit may reduce the processing capability and power consumption by skipping measurement of the second bending state.

The second control circuit may adjust the direction of the visible light 902 through the beam steering member 981, 982 based on the first bending state and the second bending state. The second control circuit may adjust the direction of the visible light 902 by adjusting a voltage applied to the liquid crystal included in the beam steering member 981, 982 based on the first bending state and the second bending state. The beam steering member 981, 982 may further include a first electrode, a second electrode, and a third electrode for adjusting the refractive index of the liquid crystal. The second control circuit may sum the first bending state and the second bending state, and apply a voltage of the first electrode to the first electrode, a voltage of the second electrode to the second electrode, and a voltage of the third electrode to the third electrode, corresponding to a result of the summing.

The beam steering member 981, 982 may include a first transparent member and a second transparent member for enclosing the liquid crystal, and torsion adjusters (not shown). A bend sensor may measure a first torsion state between a temple and a frame. A second control circuit may measure a second torsion state of a bridge based on a result of detection by an infrared sensor. The torsion adjusters may adjust a positional relationship between the first transparent member and the second transparent member. The second control circuit may adjust the positional relationship between the first transparent member and the second transparent member through the torsion adjusters based on the first torsion state and the second torsion state.

Figure 10A:
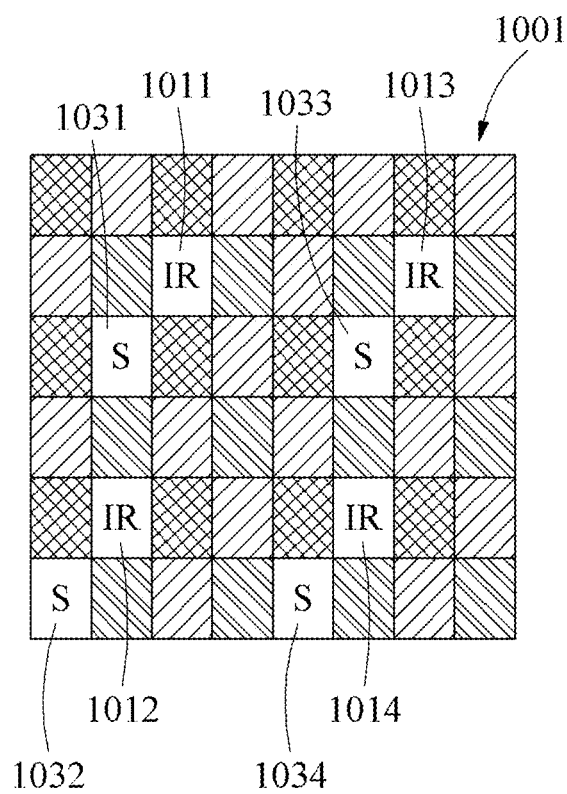
FIGS. 10A and 10B illustrate a structure of a display of a wearable electronic device according to embodiments of this disclosure.
Figure 10B:
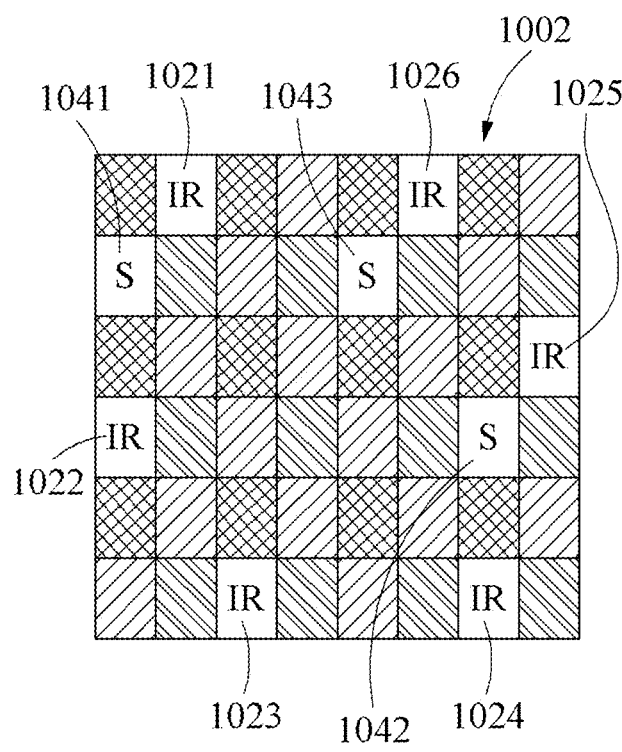

FIGS. 10A and 10B illustrate a structure of a display of a wearable electronic device according to embodiments of this disclosure.

A self-luminous display 1001, 1002 (e.g., the self-luminous display 961, 962 of FIG. 9) may include a plurality of visible-light pixels and a plurality of infrared pixels. The plurality of infrared pixels may be disposed in various patterns in the self-luminous display. For example, the plurality of infrared pixels may be linearly vertically arranged or may be horizontally arranged. The plurality of infrared pixels may be linearly and diagonally arranged.

Referring to FIG. 10A, in certain embodiments, a plurality of infrared pixels 1011, 1012, 1013, and 1014 may be randomly disposed in the self-luminous display 1001. The plurality of infrared pixels 1011, 1012, 1013, and 1014 may be randomly arranged in an area of the self-luminous display 1001 corresponding to an iris of a user. The above arrangement pattern may be relatively easily used for gaze tracking in comparison to a linear pattern. In another example embodiment, the self-luminous display 1001 may further include a plurality of gaze tracking sensors 1031, 1032, 1033, and 1034. The plurality of gaze tracking sensors 1031, 1032, 1033, and 1034 may be arranged in a unique pattern, or may be randomly arranged similarly to the plurality of infrared pixels 1011, 1012, 1013, and 1014. The plurality of gaze tracking sensors 1031, 1032, 1033, and 1034 may detect infrared light reflected by an eye of the user after emitted by the plurality of infrared pixels 1011, 1012, 1013, and 1014.

Referring to FIG. 10B, a plurality of infrared pixels 1021, 1022, 1023, 1024, 1025, and 1026 may be disposed in a circle in the self-luminous display 1002. The plurality of infrared pixels 1021, 1022, 1023, 1024, 1025, and 1026 may be disposed in a circle in an area of the self-luminous display 1002 corresponding to an edge of an iris of the user. The above arrangement pattern may be relatively easily used for gaze tracking in comparison to a linear pattern. In another example embodiment, the self-luminous display 1002 may further include a plurality of gaze tracking sensors 1041, 1042, and 1043. The plurality of gaze tracking sensors 1041, 1042, and 1043 may be arranged in a unique pattern, or may be randomly arranged similarly to the plurality of infrared pixels 1021, 1022, 1023, 1024, 1025, and 1026. The plurality of gaze tracking sensors 1041, 1042, and 1043 may detect infrared light reflected by an eye of the user after emitted by the plurality of infrared pixels 1021, 1022, 1023, 1024, 1025, and 1026.

Figure 11:
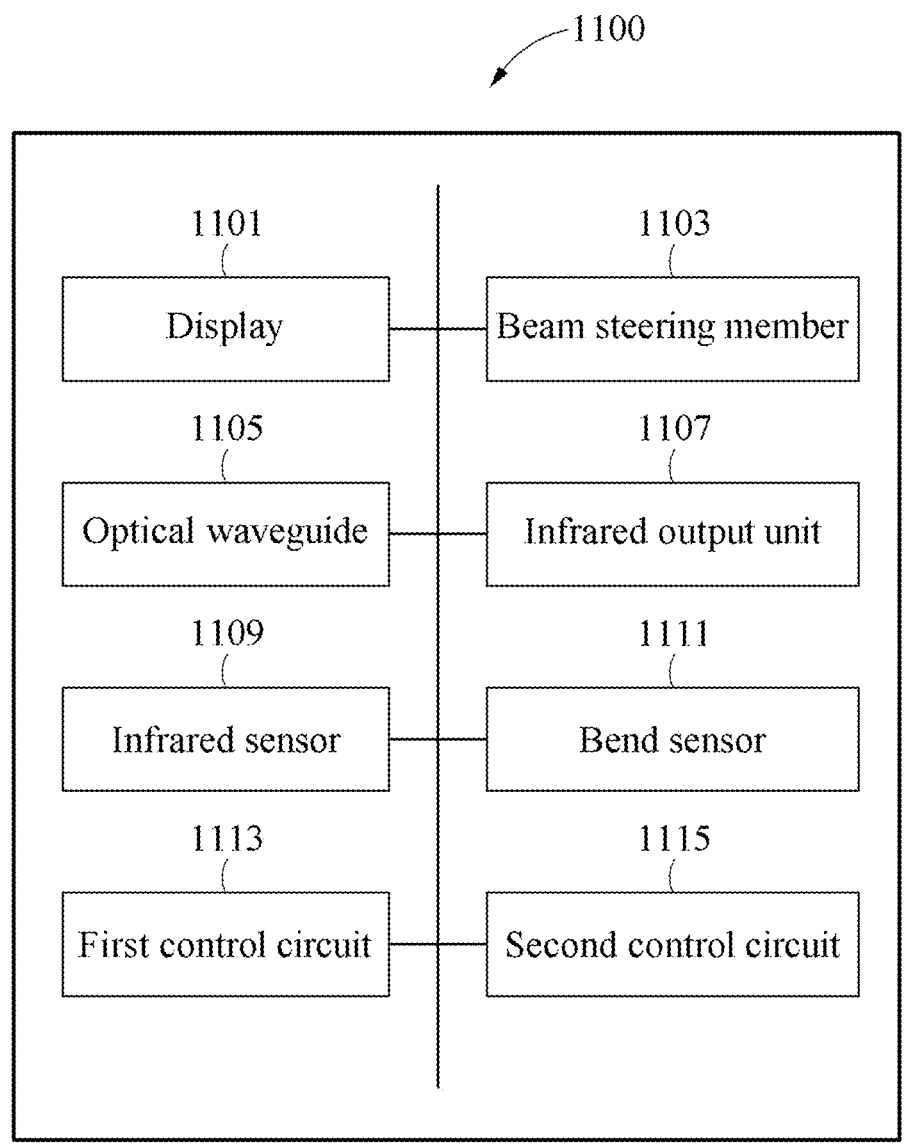
FIG. 11 illustrates a block diagram of a configuration of a wearable electronic device according to embodiments of this disclosure.

FIG. 11 illustrates a block diagram of a configuration of a wearable electronic device according to embodiments of this disclosure.

Referring to FIG. 11, a wearable electronic device 1100 (e.g., the electronic device 100 of FIG. 1, and the wearable electronic device 200 of FIG. 2) may include a display 1101 (e.g., the display 205, 210 of FIG. 2), a beam steering member 1103 (e.g., the beam steering member 410a, 410b of FIG. 4A), an optical waveguide 1105 (e.g., the optical waveguide 215a, 215b of FIG. 2), an infrared output unit 1107 (e.g., the infrared output unit 413a, 413b), an infrared sensor 1109 (e.g., the infrared sensor 411a, 411b of FIG. 4A), a bend sensor 1111 (e.g., the bend sensor 412a, 412b of FIG. 4A), a first control circuit 1113 (e.g., the control circuit included in the display 205, 210 of FIG. 2), and a second control circuit 1115 (e.g., the control circuit positioned in the PCB 235a, 235b of FIG. 2). The wearable electronic device 1100 may include a skeletal member, and the skeletal member may include a temple (e.g., the temple 401a, 401b of FIG. 4A), a frame (e.g., the frame 402a, 402b of FIG. 4A), and a bridge (e.g., the bridge 403 of FIG. 4A).

The display 1101 may be fixed to the temple. The display 1101 may output visible light corresponding to a virtual image. The beam steering member 1103 may include a liquid crystal. The beam steering member 1103 may adjust the direction of the visible light traveling from an exit pupil of the display 1101 to an input grating (e.g., the input grating 911, 912) of the optical waveguide 1105 using the liquid crystal. The optical waveguide 1105 may adjust a path of the visible light and output the virtual image. The infrared output unit 1107 may output infrared light for tracking a gaze of the user. The infrared sensor 1109 may detect infrared light reflected from a pupil of the user. The bend sensor 1111 may be connected to the temple and the frame to measure a first bending state between the temple and the frame. The first control circuit 1113 may supply driving power and a control signal to the display. The second control circuit 1115 may supply driving power and a control signal to the infrared sensor 1109 and the infrared output unit 1107.

The second control circuit 1115 may measure a second bending state of the bridge based on a result of detection by the infrared sensor 1109. The result of detection by the infrared sensor 1109 may include a left eye angle with respect to the pupil of the left eye of the user and a right eye angle with respect to the pupil of the right eye of the user. The second control circuit 1115 may measure a second bending state by comparing the left eye angle and the right eye angle. The second control circuit 1115 may measure the second bending state when a difference between the left eye angle and the right eye angle is greater than a threshold.

The second control circuit 1115 may adjust the direction of the visible light through the beam steering member 1103 based on the first bending state and the second bending state. The bend sensor 1111 may include a variable resistor (e.g., the variable resistor 601a of FIG. 6B) of which resistance changes according to the first bending state. The second control circuit 1115 may measure the first bending state based on an output voltage at one end of the variable resistor. The second control circuit 1115 may adjust the direction of the visible light by adjusting a voltage applied to the liquid crystal (e.g., the liquid crystal 421a of FIG. 7A) included in the beam steering member based on the first bending state and the second bending state.

The beam steering member 1103 may further include a first electrode (e.g., the first electrode 701 of FIG. 7B), a second electrode (e.g., the second electrode 702 of FIG. 7B), and a third electrode (e.g., the third electrode 703 of FIG. 7B) for adjusting the refractive index of the liquid crystal. The second control circuit 1115 may sum the first bending state and the second bending state, and apply a voltage of the first electrode to the first electrode, a voltage of the second electrode to the second electrode, and a voltage of the third electrode to the third electrode, corresponding to a result of the summing.

The beam steering member 1103 may include a first transparent member and a second transparent member for enclosing the liquid crystal, and torsion adjusters configured to adjust a positional relationship between the first transparent member and the second transparent member. A bend sensor may measure a first torsion state between a temple and a frame. The second control circuit 1115 may measure a second torsion state of the bridge based on a result of detection by the infrared sensor. The second control circuit 1115 may adjust the positional relationship between the first transparent member and the second transparent member through the torsion adjusters based on the first torsion state and the second torsion state.

Figure 12:
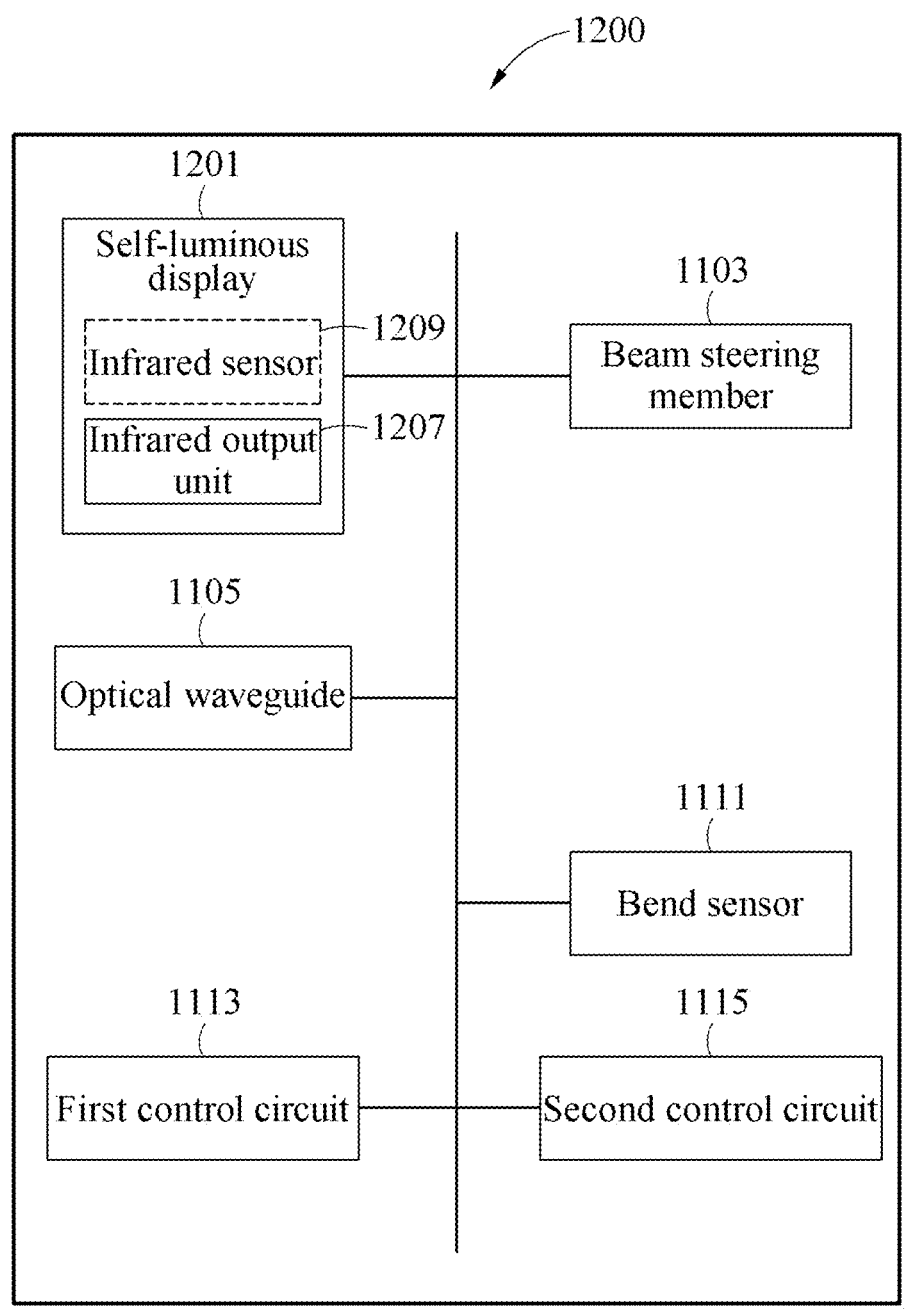
FIG. 12 illustrates a block diagram of a configuration of a wearable electronic device according to embodiments of this disclosure.

FIG. 12 illustrates a block diagram of a configuration of a wearable electronic device according to a embodiments of this disclosure.

According to certain embodiments, a wearable electronic device 1200 (such as the electronic device 100 of FIG. 1, the wearable electronic device 200 of FIG. 2, and the wearable electronic device 1100 of FIG. 11) may include a self-luminous display 1201 (e.g., the self-luminous display 961, 962 of FIG. 9), the beam steering member 1103 (e.g., the beam steering member 410a, 410b of FIG. 4A), an optical waveguide 1105 (e.g., the optical waveguide 215a, 215b of FIG. 2), an infrared output unit 1207 (e.g., the infrared output unit included in the self-luminous display 961, 962 of FIG. 9), an infrared sensor 1209 (e.g., the infrared sensor included in the self-luminous display 961, 962 of FIG. 9 or the infrared sensor 411a, 411b of FIG. 4A), a bend sensor 1111 (e.g., the bend sensor 412a, 412b of FIG. 4A), a first control circuit 1113 (e.g., the control circuit included in the display 205, 210 of FIG. 2), and a second control circuit 1115 (e.g., the control circuit positioned in the PCB 235a, 235b of FIG. 2). The wearable electronic device 1100 may include a skeletal member, and the skeletal member may include a temple (e.g., the temple 401a, 401b of FIG. 4A), a frame (e.g., the frame 402a, 402b of FIG. 4A), and a bridge (e.g., the bridge 403 of FIG. 4A).

The self-luminous display 1201 may be fixed to the temple. The self-luminous display 1201 may include a plurality of visible-light pixels for outputting visible light corresponding to a virtual image, and a plurality of infrared pixels for outputting infrared light. The beam steering member 1103 may include a liquid crystal. The beam steering member 1103 may adjust the direction of the visible light traveling from an exit pupil of the self-luminous display 1201 to an input grating (e.g., the input grating 911, 912 of FIG. 9) of the optical waveguide using the liquid crystal. The optical waveguide 1105 may adjust a path of infrared light and output the infrared light to a pupil of the user, and adjust a path of the visible light and output the virtual image. The infrared sensor 1209 may detect infrared light reflected from the pupil of the user. The bend sensor 1111 may be connected to the temple and the frame to measure a first bending state between the temple and the frame. The first control circuit 1113 may supply driving power and a control signal to the self-luminous display 1201.

The second control circuit 1115 may measure a second bending state of the bridge based on the result of detection by the infrared sensor 1209. The second control circuit 1115 may adjust the direction of the visible light through the beam steering member 1103 based on the first bending state and the second bending state.

The result of detection by the infrared sensor 1209 may include a left eye angle with respect to the pupil of the left eye of the user and a right eye angle with respect to the pupil of the right eye of the user. The second control circuit 1115 may measure a second bending state by comparing the left eye angle and the right eye angle. The second control circuit 1115 may measure the second bending state when a difference between the left eye angle and the right eye angle is greater than a threshold.

The bend sensor 1111 may include a variable resistor of which resistance changes according to the first bending state. The second control circuit 1115 may measure the first bending state based on an output voltage at one end of the variable resistor.

The second control circuit 1115 may adjust the direction of the visible light by adjusting a voltage applied to the liquid crystal included in the beam steering member 1103 based on the first bending state and the second bending state. The beam steering member 1103 may further include a first electrode, a second electrode, and a third electrode for adjusting the refractive index of the liquid crystal. The second control circuit 1115 may sum the first bending state and the second bending state, and apply a voltage of the first electrode to the first electrode, a voltage of the second electrode to the second electrode, and a voltage of the third electrode to the third electrode, corresponding to a result of the summing.

The beam steering member 1103 may include a first transparent member and a second transparent member for enclosing the liquid crystal, and torsion adjusters (not shown). The torsion adjusters may adjust a positional relationship between the first transparent member and the second transparent member. The bend sensor 1111 may measure a first torsion state between the temple and the frame. The second control circuit 1115 may measure a second torsion state of the bridge based on a result of detection by the infrared sensor. The second control circuit 1115 may adjust the positional relationship between the first transparent member and the second transparent member through the torsion adjusters based on the first torsion state and the second torsion state.

Figure 13:
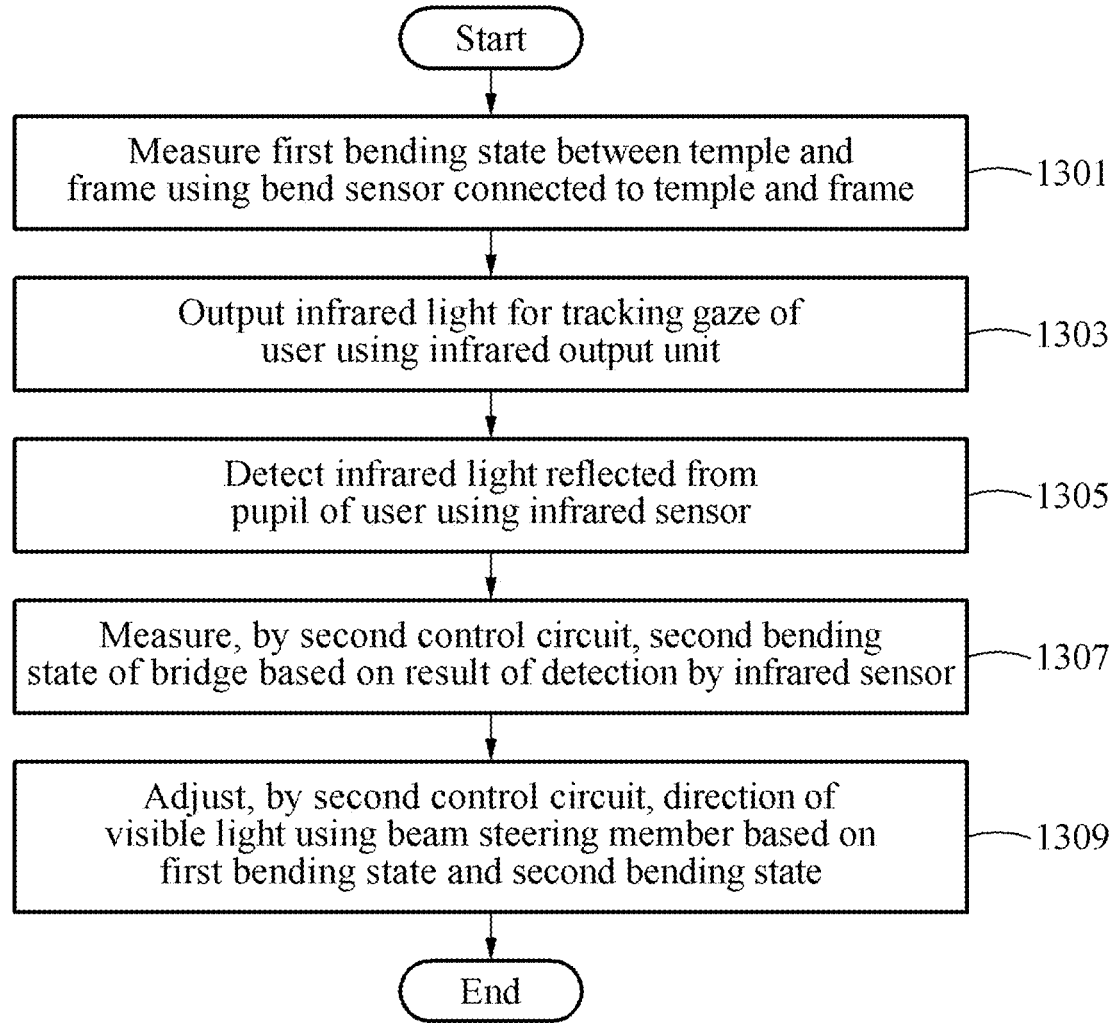
FIG. 13 illustrate a flowchart of an operation of a wearable electronic device according to embodiments of this disclosure.

FIG. 13 illustrates a flowchart of an operation of a wearable electronic device according to embodiments of this disclosure.

According to certain embodiments, a wearable electronic device (e.g., the electronic device 100 of FIG. 1, the wearable electronic device 200 of FIG. 2, the wearable electronic device 1100 of FIG. 11, and the wearable electronic device 1200 of FIG. 12) may include a display (e.g., the display 205, 210 of FIG. 2), a beam steering member (e.g., the beam steering member 410a, 410b of FIG. 4A), an optical waveguide (e.g., the optical waveguide 215a, 215b of FIG. 2), an infrared output unit (e.g., the infrared output unit 413a, 413b), an infrared sensor (e.g., the infrared sensor 411a, 411b of FIG. 4A), a bend sensor (e.g., the bend sensor 412a, 412b of FIG. 4A), a first control circuit (e.g., the control circuit included in the display 205, 210 of FIG. 2), and a second control circuit (e.g., the control circuit positioned in the PCB 235a, 235b of FIG. 2). The wearable electronic device may include a skeletal member, and the skeletal member may include a temple (e.g., the temple 401a, 401b of FIG. 4A), a frame (e.g., the frame 402a, 402b of FIG. 4A), and a bridge (e.g., the bridge 403 of FIG. 4A).

According to certain embodiments, in operation 1301, the wearable electronic device may measure a first bending state between the temple and the frame using the bend sensor connected to the temple and the frame. The bend sensor may include a variable resistor (e.g., the variable resistor 601a of FIG. 6B) of which resistance changes according to the first bending state. The wearable electronic device may measure, by the second control circuit, the first bending state based on an output voltage at one end of the variable resistor.

According to certain embodiments, in operation 1303, the wearable electronic device may output infrared light for tracking a gaze of a user using the infrared output unit.

According to certain embodiments, in operation 1305, the wearable electronic device may detect infrared light reflected from a pupil of the user using the infrared sensor.

According to certain embodiments, in operation 1307, the wearable electronic device may measure, by the second control circuit, a second bending state of the bridge based on a result of detection by the infrared sensor. The result of detection by the infrared sensor may include a left eye angle with respect to the pupil of the left eye of the user and a right eye angle with respect to the pupil of the right eye of the user.

The wearable electronic device may measure, by the second control circuit, the second bending state by comparing the left eye angle and the right eye angle. The wearable electronic device may measure the second bending state through the second control circuit when a difference between the left eye angle and the right eye angle is greater than a threshold.

According to certain embodiments, in operation 1309, the wearable electronic device may adjust, by the second control circuit, the direction of the visible light using the beam steering member based on the first bending state and the second bending state. The wearable electronic device may adjust, by the second control circuit, the direction of the visible light by adjusting a voltage applied to the liquid crystal included in the beam steering member based on the first bending state and the second bending state.

The beam steering member may include a first transparent member and a second transparent member for enclosing the liquid crystal, and torsion adjusters. The torsion adjusters may adjust a positional relationship between the first transparent member and the second transparent member. The wearable electronic device may measure, by the bend sensor, a first torsion state between the temple and the frame.

The wearable electronic device may measure, by the second control circuit, a second torsion state of the bridge based on a result of detection by the infrared sensor. The wearable electronic device may adjust a positional relationship between the first transparent member and the second transparent member through the torsion adjuster based on the first torsion state and the second torsion state.

The electronic device according to various example embodiments may be one of various types of electronic devices. The electronic device may include, for example, a portable communication device (e.g., a smartphone), a computer device, a portable multimedia device, a portable medical device, a camera, a wearable device, or a home appliance device. According to certain embodiments of the disclosure, the electronic device is not limited to those described above.

It should be appreciated that various example embodiments of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and may refer to components in other aspects (e.g., importance or order) is not limited. It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various example embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to certain embodiments, the module may be implemented in a form of an application-specific integrated circuit (ASIC).

Various example embodiments as set forth herein may be implemented as software (e.g., the program 140) including one or more instructions that are stored in a storage medium (e.g., the internal memory 136 or the external memory 138) that is readable by a machine (e.g., the electronic device 101) For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to certain embodiments, a method according to various example embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various example embodiments, each component (e.g., a module or a program) of the above-described components may include a single entity or multiple entities, and some of the multiple entities may be separately disposed in different components. According to various example embodiments, one or more of the above-described components or operations may be omitted, or one or more other components or operations may be added. Alternatively or additionally, a plurality of components (e.g., modules or programs) may be integrated into a single component. In such a case, according to various example embodiments, the integrated component may still perform one or more functions of each of the plurality of components in the same or similar manner as they are performed by a corresponding one of the plurality of components before the integration. According to various example embodiments, operations performed by the module, the program, or another component may be carried out sequentially, in parallel, repeatedly, or heuristically, or one or more of the operations may be executed in a different order or omitted, or one or more other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. A wearable electronic device, comprising:
a skeletal member comprising a temple, a frame, and a bridge;
a display fixed to the temple and configured to output visible light corresponding to a virtual image;
a beam steering member comprising a liquid crystal and configured to adjust a direction of the visible light traveling from an exit pupil of the display to an input grating of an optical waveguide using the liquid crystal;
the optical waveguide configured to adjust a path of the visible light and output the virtual image;
an infrared output unit configured to output infrared light for tracking a gaze of a user;
an infrared sensor configured to detect infrared light reflected from a pupil of the user;
a bend sensor connected to the temple and the frame, the bend sensor configured to measure a first bending state between the temple and the frame;
a first control circuit configured to supply driving power and a control signal to the display; and
a second control circuit configured to: supply driving power and a control signal to the infrared sensor and the infrared output unit, measure a second bending state of the bridge based on a result of the detecting by the infrared sensor, and adjust the direction of the visible light through the beam steering member based on the first bending state and the second bending state.

2. The wearable electronic device of claim 1, wherein:
the result of the detecting by the infrared sensor comprises a left eye angle with respect to a pupil of a left eye of the user and a right eye angle with respect to a pupil of a right eye of the user, and
the second control circuit is configured to measure the second bending state by comparing the left eye angle and the right eye angle.

3. The wearable electronic device of claim 2, wherein the second control circuit is configured to measure the second bending state when a difference between the left eye angle and the right eye angle is greater than a threshold.

4. The wearable electronic device of claim 1, wherein:
the bend sensor comprises a variable resistor that changes resistance according to the first bending state, and
the second control circuit is configured to measure the first bending state based on an output voltage at one end of the variable resistor.

5. The wearable electronic device of claim 1, wherein the second control circuit is configured to adjust the direction of the visible light by adjusting a voltage applied to the liquid crystal included in the beam steering member based on the first bending state and the second bending state.

6. The wearable electronic device of claim 5, wherein:
the beam steering member further comprises a first electrode, a second electrode, and a third electrode configured to adjust a refractive index of the liquid crystal, and
the second control circuit is configured to apply a voltage of the first electrode to the first electrode, a voltage of the second electrode to the second electrode, a voltage of the third electrode to the third electrode based on the first bending state and the second bending state.

7. The wearable electronic device of claim 1, wherein:
the beam steering member comprises a first transparent member and a second transparent member for enclosing the liquid crystal, and torsion adjusters configured to adjust a positional relationship between the first transparent member and the second transparent member, the bend sensor is configured to measure a first torsion state between the temple and the frame, and the second control circuit is configured to measure a second torsion state of the bridge based on the result of the detecting by the infrared sensor, and adjust the positional relationship between the first transparent member and the second transparent member through the torsion adjusters based on the first torsion state and the second torsion state.

8. A wearable electronic device, comprising:

a skeletal member comprising a temple, a frame, and a bridge;

a self-luminous display fixed to the temple and comprising a plurality of visible-light pixels configured to output visible light corresponding to a virtual image and a plurality of infrared pixels configured to output infrared light;

a beam steering member comprising a liquid crystal and configured to adjust a direction of the visible light traveling from an exit pupil of the self-luminous display to an input grating of an optical waveguide using the liquid crystal;

an optical waveguide configured to adjust a path of the infrared light to output the infrared light to a pupil of a user and adjust a path of the visible light to output the virtual image;

an infrared sensor configured to detect infrared light reflected from the pupil of the user;

a bend sensor connected to the temple and the frame, the bend sensor configured to measure a first bending state between the temple and the frame;

a first control circuit configured to supply driving power and a control signal to the self-luminous display; and a second control circuit configured to: measure a second bending state of the bridge based on a result of the detecting by the infrared sensor, and adjust the direction of the visible light through the beam steering member based on the first bending state and the second bending state.

9. The wearable electronic device of claim 8, wherein:

the result of the detecting by the infrared sensor comprises a left eye angle with respect to a pupil of a left eye of the user and a right eye angle with respect to a pupil of a right eye of the user, and the second control circuit is configured to measure the second bending state by comparing the left eye angle and the right eye angle.

10. The wearable electronic device of claim 9, wherein the second control circuit is configured to measure the second bending state when a difference between the left eye angle and the right eye angle is greater than a threshold.

11. The wearable electronic device of claim 8, wherein:

the bend sensor comprises a variable resistor that changes resistance according to the first bending state, and the second control circuit is configured to measure the first bending state based on an output voltage at one end of the variable resistor.

12. The wearable electronic device of claim 8, wherein the second control circuit is configured to adjust the direction of the visible light by adjusting a voltage applied to the liquid crystal included in the beam steering member based on the first bending state and the second bending state.

13. The wearable electronic device of claim 12, wherein:

the beam steering member further comprises a first electrode, a second electrode, and a third electrode configured to adjust a refractive index of the liquid crystal, and the second control circuit is configured to: sum the first bending state and the second bending state, and apply a voltage of the first electrode to the first electrode, a voltage of the second electrode to the second electrode, a voltage of the third electrode to the third electrode, corresponding to a result of the summing.

14. The wearable electronic device of claim 8, wherein:

the beam steering member comprises a first transparent member and a second transparent member for enclosing the liquid crystal, and torsion adjusters configured to adjust a positional relationship between the first transparent member and the second transparent member, the bend sensor is configured to measure a first torsion state between the temple and the frame, and the second control circuit is configured to measure a second torsion state of the bridge based on the result of the detecting by the infrared sensor, and adjust the positional relationship between the first transparent member and the second transparent member through the torsion adjusters based on the first torsion state and the second torsion state.

15. A method of controlling a wearable electronic device, the method comprising:

measuring a first bending state between a temple and a frame using a bend sensor connected to the temple and the frame;

outputting infrared light for tracking a gaze of a user using an infrared output unit;

detecting infrared light reflected from a pupil of the user using an infrared sensor;

outputting, by a display, visible light corresponding to a virtual image;

supplying by a first control circuit, driving power and a control signal to the display;

measuring, by a second control circuit, a second bending state of a bridge based on a result of the detecting by the infrared sensor;

adjusting, by the second control circuit, a direction of the visible light using a beam steering member based on the first bending state and the second bending state;

adjusting a direction of the visible light traveling from an exit pupil of the display to an input grating of an optical waveguide using liquid crystal; and adjusting a path of the visible light and output the virtual image and supplying, by the second control circuit, driving power and a control signal to the infrared sensor and the infrared output unit.

16. The method of claim 15, wherein:

the result of the detecting by the infrared sensor comprises a left eye angle with respect to a pupil of a left eye of the user and a right eye angle with respect to a pupil of a right eye of the user, and the measuring of the second bending state comprises measuring, by the second control circuit, the second bending state by comparing the left eye angle and the right eye angle.

17. The method of claim 16, wherein the measuring of the second bending state comprises measuring, by the second control circuit, the second bending state when a difference between the left eye angle and the right eye angle is greater than a threshold.

18. The method of claim 15, wherein:
measuring the first bending state comprises measuring, by the second control circuit, the first bending state based on an output voltage at one end of a variable resistor included in the bend sensor.

19. The method of claim 15, wherein adjusting the direction of the visible light comprises adjusting, by the second control circuit, a voltage applied to the liquid crystal based on the first bending state and the second bending state.

20. The method of claim 15, further comprising:
measuring, by the bend sensor, a first torsion state between the temple and the frame;
measuring, by the second control circuit, a second torsion state of the bridge based on the result of the detecting by the infrared sensor; and
adjusting a positional relationship between a first transparent member and a second transparent member of the beam steering member based on the first torsion state and the second torsion state, the first transparent member and the second transparent member enclosing the liquid crystal.

* * * * *